(12) United States Patent
Wood

(10) Patent No.: US 8,141,452 B2
(45) Date of Patent: Mar. 27, 2012

(54) ROTATIONAL MOTION-POSITIONING APPARATUS

(76) Inventor: Barry Lynn Wood, Newnan, GA (US)

( * ) Notice: Subject to any disclaimer, the term of this patent is extended or adjusted under 35 U.S.C. 154(b) by 1397 days.

(21) Appl. No.: 11/586,788

(22) Filed: Oct. 26, 2006

(65) Prior Publication Data

US 2008/0141824 A1   Jun. 19, 2008

(51) Int. Cl.
G05G 11/00 (2006.01)

(52) U.S. Cl. ............... 74/490.13; 74/490.08; 248/179.1; 269/66

(58) Field of Classification Search ............... 74/479.01, 74/16, 490.07, 490.08, 490.13; 248/278.1, 248/179.1, 183.4, 186.2, 282.1, 550; 269/66; 108/22, 94

See application file for complete search history.

(56) References Cited

U.S. PATENT DOCUMENTS

| | | | |
|---|---|---|---|
| 1,267,812 A | 5/1918 | Smith | |
| 1,820,436 A | 8/1931 | Carlson | |
| 2,524,238 A | 10/1950 | Soule | |
| 2,686,095 A | 8/1954 | Carlson | |
| 2,944,858 A | 7/1960 | Engelsted | |
| 3,215,391 A | 11/1965 | Storm | |
| 3,288,421 A | 11/1966 | Peterson | |
| 3,295,224 A | 1/1967 | Cappel | |
| 3,374,977 A | 3/1968 | Moy | |
| 3,577,659 A | 5/1971 | Kail | |
| 3,658,286 A | 4/1972 | Terai | |
| 3,693,979 A * | 9/1972 | Koett | 473/279 |
| 4,343,610 A | 8/1982 | Chou | |
| 4,360,182 A | 11/1982 | Titus | |
| 4,370,813 A | 2/1983 | Burniski | |
| 4,374,497 A | 2/1983 | Harmand | |
| 4,575,039 A * | 3/1986 | Persson et al. | 248/550 |
| 4,753,596 A | 6/1988 | Hart | |
| 4,779,796 A * | 10/1988 | Lai | 473/279 |
| 4,819,002 A * | 4/1989 | Reboullet | 343/765 |
| 4,887,967 A | 12/1989 | Letovsky | |
| 5,018,973 A | 5/1991 | Alet | |
| 5,031,547 A * | 7/1991 | Hirose | 108/140 |
| 5,340,111 A | 8/1994 | Froelich | |
| 5,358,251 A | 10/1994 | Ashton | |
| 5,366,375 A | 11/1994 | Sarnicola | |
| 5,431,406 A * | 7/1995 | Ishii | 248/396 |
| 5,518,245 A * | 5/1996 | Nelson | 473/279 |
| 5,549,522 A | 8/1996 | Chang | |

(Continued)

FOREIGN PATENT DOCUMENTS

EP   155922 A1 * 9/1985

(Continued)

OTHER PUBLICATIONS

Robert L. Norton P.E., Cam Design and Manufacturing Handbook, 2002, pp. 1-8, ISBN: 0-8311-3122-5, Industrial Press Inc., New York, NY, USA.

*Primary Examiner* — Richard W Ridley
*Assistant Examiner* — Matthew A Johnson

(57) ABSTRACT

A single rotational axis motion generation and positioning apparatus having a work load support connected to a housing by a pivot joint. Rotation of an axial cam supported by the housing, creates a displacement which is transmitted to the work load support by at least one axial cam follower. The axial cam follower displacement is transformed into a rotational torque on the work load support about the pivot joint, which results in rotation of the work load support about the rotational axis of the pivot joint.

44 Claims, 34 Drawing Sheets

U.S. PATENT DOCUMENTS

| | | |
|---|---|---|
| 5,639,160 A | 6/1997 | Kishimoto |
| 5,752,834 A | 5/1998 | Ling |
| 6,077,078 A | 6/2000 | Alet |
| 6,095,926 A | 8/2000 | Hettema |
| 6,161,809 A * | 12/2000 | Mahy et al. .............. 248/396 |
| 6,162,058 A | 12/2000 | Yang |
| 6,182,582 B1 * | 2/2001 | Bailey et al. .............. 108/94 |
| 6,196,081 B1 | 3/2001 | Yau |
| 6,283,757 B1 | 9/2001 | Meghnot |
| 6,402,625 B2 | 6/2002 | Armstrong |
| 6,445,960 B1 | 9/2002 | Borta |
| 6,681,703 B2 * | 1/2004 | Wells et al. .............. 108/20 |
| 7,520,483 B2 * | 4/2009 | Rand et al. ............ 248/346.11 |
| 7,758,444 B2 * | 7/2010 | Crossley .............. 473/279 |
| 2002/0029610 A1 | 3/2002 | Chrystall |
| 2002/0045955 A1 | 4/2002 | Borta |
| 2002/0055086 A1 | 5/2002 | Hodgetts |
| 2002/0115043 A1 | 8/2002 | Baker |
| 2003/0125173 A1 | 7/2003 | Fan |
| 2005/0277092 A1 | 12/2005 | Hwang |

FOREIGN PATENT DOCUMENTS

| | | |
|---|---|---|
| GB | 753096 | 7/1956 |
| JP | 11-009846 | 1/1999 |
| JP | 11-319327 | 11/1999 |
| JP | 2003-236254 | 8/2003 |

* cited by examiner

ROTATIONAL MOTION-POSITIONING APPARATUS

CROSS-REFERENCE TO RELATED APPLICATIONS

Not Applicable

FEDERALLY SPONSORED RESEARCH

Not Applicable

BACKGROUND OF THE INVENTION

This invention relates to a motion and positioning apparatus. More specifically, a rotational motion and rotational positioning apparatus controlled by a computer or other external device.

Rotational motion generating apparatuses are important components of virtual reality training and entertainment simulators. Rotational motion enhances the sensory stimuli of acceleration for a more realistic experience during the simulator session. Typical motion platforms capable of generating rotational motion are large complex systems requiring coordination of multiple interdependent actuators to generate an axis of rotational motion.

Rotational positioning is found in such applications as robotic manipulators, machine tool work piece positioning, antenna positioning, and golf training platforms. Typical positioning platforms capable of positioning about a rotational axis use hydraulic, pneumatic, or complex mechanical actuators to move the platform. Because of the heat, noise, and fluid vaporization associated with hydraulics and pneumatics, their usage environment is restrictive. Complex mechanical actuators are expensive and require frequent maintenance to function properly.

For the foregoing reasons, there is a need for an apparatus capable of generating rotational movement about a rotational axis using a single independent drive source and where the apparatus is self-contained. The rotational motion and positioning apparatus also needs to be adaptable, reliable, and have a competitive life-cycle cost.

SUMMARY OF THE INVENTION

Accordingly, the present invention is directed to a motion-positioning apparatus capable of generating rotational movement about a single rotational axis of a three orthogonal axes system. The motion-positioning apparatus is a self-contained motion-positioning apparatus using a single independent drive source.

The motion-positioning apparatus having features of the present invention comprises a housing, a work load support, a pivot joint, a first axial cam, a first axial cam follower, and a first rotational axis drive unit. The housing and work load support being substantially rigid to support the work load. The housing having a cylindrical bore and a load support surface. The pivot joint is attached between the housing and the work load support such that the pivot joint is center of the housing cylindrical bore. The pivot joint having at least one-degree of freedom and being able to rotate about the first rotational axis of the motion-positioning apparatus. The first axial cam comprises a substantially rigid cylinder having a load support surface. The first axial cam cylinder having an axial cam surface. Also, the first axial cam having a bore to provide clearance about the pivot joint. The end opposite the first axial cam surface of the first axial cam cylinder is inserted into the housing cylindrical bore such that work load force is transferred from the first axial cam load support surface to the housing load support surface. Thus, the first axial cam can be rotated relative to the housing. The first rotational axis drive unit is mounted to the housing with means for coupling rotational energy from the first rotational axis drive unit to the first axial cam, whereby the first rotational axis drive unit rotates the first axial cam relative to the housing. The means for coupling rotational energy from the first rotational axis drive unit to the first axial cam, is a drive set selected from group consisting of parallel shaft drive sets, 90 degree intersecting drive sets, or 90 degree non-intersecting drive sets. The first axial cam follower comprises at least one first axial cam follower attached to the work load support such that the first axial cam follower contacts the first axial cam surface, whereby rotation of the first axial cam will rotate the work load support about the first rotational axis.

Since the motion-positioning apparatus is self-contained and uses a single independent drive source, the motion-positioning apparatus is easily adaptive to motion generation and positioning applications. By using a single-drive source, mechanical complexity of the motion-positioning apparatus is minimized, thus resulting in lower life-cycle cost and increased reliability.

DESCRIPTION OF THE DRAWINGS

These and other features, aspects, and advantages of the present invention will become better understood with regard to the following description, appended claims, and accompanying drawings where:

DESCRIPTION OF THE INVENTION

Definitions

Figure 1:
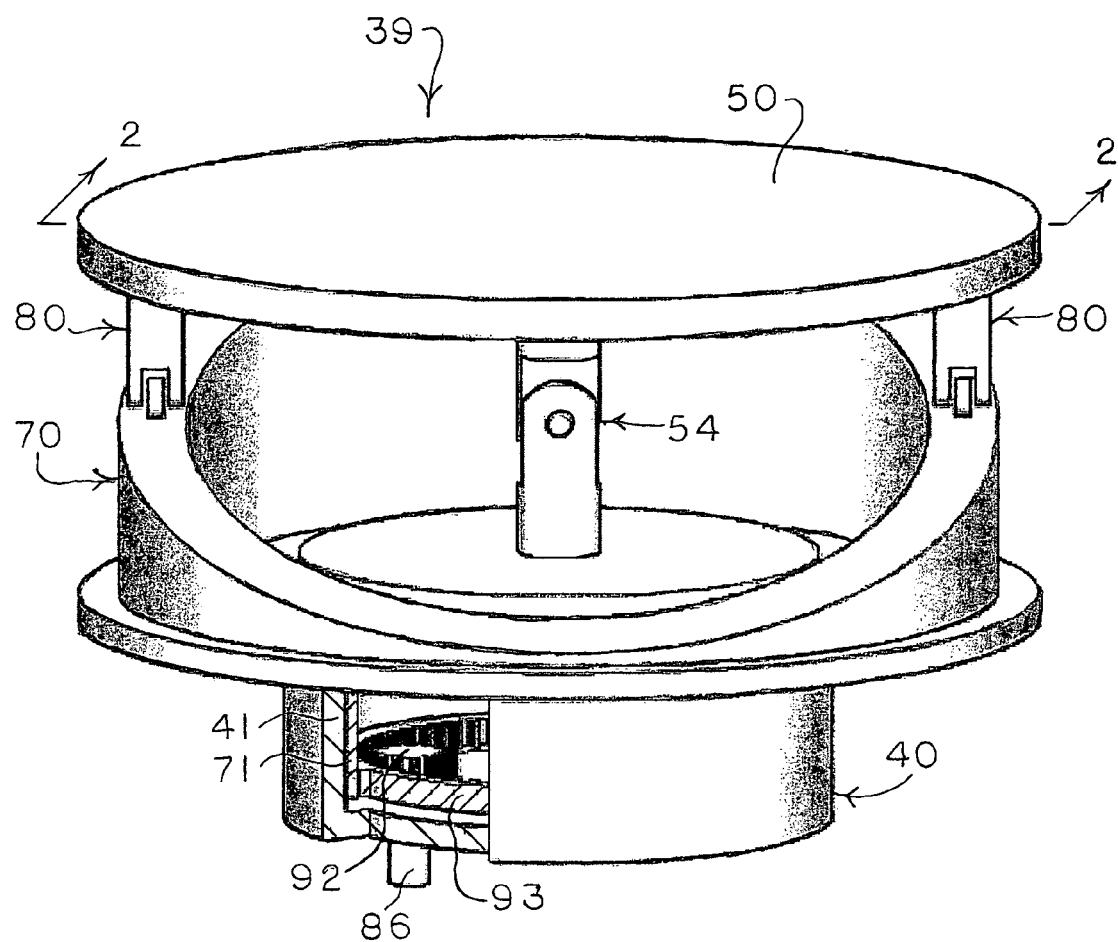
FIG. 1 is a perspective view of the motion-positioning apparatus.

Parallel Shaft Drive Set: Rotational energy coupling components comprising: a drive component, a driven component, and zero or more intermediate components. The parallel shaft drive set provide means for coupling or transmitting rotational energy from a drive source to a rotatable component capable of being rotated, where the means for coupling or transmitting rotational energy are the drive component, any existing intermediate components and the driven component. The centerline of the drive source output is parallel to the centerline of the rotatable component, thus the centerline of the drive component, the driven component and any existing intermediate components are parallel. Typical examples of a parallel shaft drive set comprises: external spur gear sets, internal spur gear sets, helical gear sets (single, double conventional, double staggered, herringbone), sprocket and chain sets, timing pulley belt sets and pulley belt sets.

90 Degree Intersecting Drive Set: Rotational energy coupling components comprising: a drive component and a driven component. The 90 degree intersecting drive set provide means for coupling or transmitting rotational energy from a drive source to a rotatable component capable of being rotated, where the means for coupling or transmitting rotational energy are the drive component and the driven component. The centerline of the drive source output is typically perpendicular to and intersects the centerline of the rotatable component, thus the centerline of the drive component is perpendicular to and intersects the centerline of the driven component. The centerline of the drive component need not always be perpendicular to the centerline of the driven component, for the centerline of the drive component can be an angle less than or greater than 90 degrees to the centerline of the driven component. Typical examples of a 90 degree intersecting drive set comprises: straight bevel gear sets, spiral bevel gear sets, and zerol bevel gear sets.

90 Degree Non-Intersecting Drive Set: Rotational energy coupling components comprising: a drive component and a driven component. The 90 degree non-intersecting drive set provide means for coupling or transmitting rotational energy from a drive source to a rotatable component capable of being rotated, where the means for coupling or transmitting rotational energy are the drive component and the driven component. The centerline of the drive source output is typically perpendicular to and non-intersecting of the centerline of the rotatable component, thus the centerline of the drive component is perpendicular to and non-intersecting of the centerline of the driven component. The centerline of the drive component need not always be perpendicular to the centerline of the driven component, for the centerline of the drive component can be an angle less than or greater than 90 degrees to the centerline of the driven component. Typical examples of a 90 degree non-intersecting drive set comprises: worm gear sets, cross helical gear sets and hypoid gear sets.

Overhung Mount: Support means for a drive component in a drive set. The drive component is supported by a bearing or bearings on only one axial end of the drive component.

Straddle Mount: Support means for a drive component in a drive set. The drive component is supported by bearing at two axial opposite ends of the drive component.

Form-Closed Axial Cam-Follower Arrangement: Combination of 1 or more axial cam surfaces and 1 or more axial cam followers such that the geometry of the axial cam surface or the arrangement of the axial cam followers to the axial cam surface require no external force to maintain contact between the axial cam follower and axial cam surface.

First Rotational Axis of a Three Orthogonal Axes System: Three rotational axes of a three orthogonal axes typically being the roll, pitch, and yaw rotational axes. The first rotational axis being any one of the three: roll rotational axis, pitch rotational axis, or yaw rotational axis which is axially aligned with the pivot joint.

Overview

Figure 2:
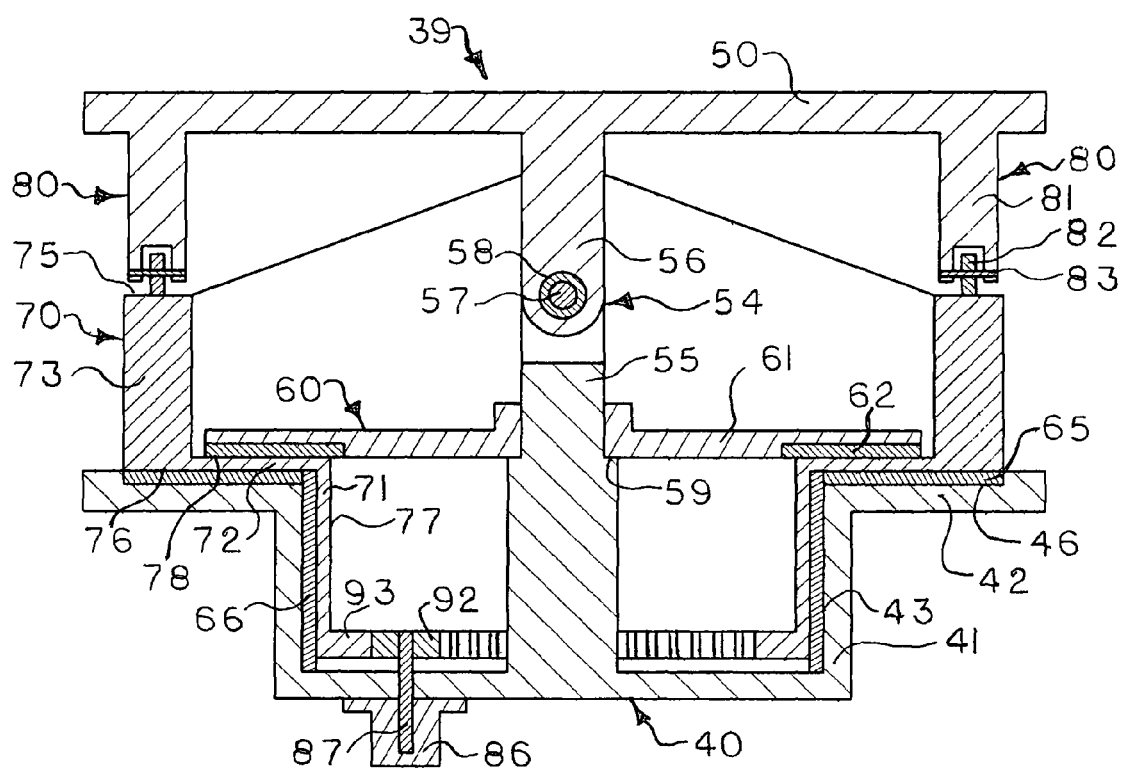
FIG. 2 is a cross-sectional view of the motion-positioning apparatus at line 2-2 of FIG. 1.

The present invention is directed to a motion-positioning apparatus capable of generating rotational movement of a work load about a first rotational axis of a three orthogonal axes system. With reference to the drawings, and particularly FIG. 1 and FIG. 2, a motion-positioning apparatus 39 comprising: a housing 40, a work load support 50, a pivot joint 54, a first axial cam 70, a first rotational axis drive unit 86, and a first axial cam follower 80. The pivot joint 54 is attached between the housing 40 and the work load support 50. The first axial cam 70 is supported by the housing 40 and rotatable relative to the housing 40. The first axial cam follower 80 is attached to the work load support 50 and contacts the first axial cam 70. The first rotational axis drive unit 86 is mounted to the housing 40, with means for coupling rotational energy from the first rotational axis drive unit 86 to the first axial cam 70. Rotation of the first axial cam 70 by the first rotational axis drive 86 unit rotates the work load support 50 about the first rotational axis of the pivot joint 54.

Detailed Description—Preferred Embodiment: FIG. 1 and FIG. 2

FIG. 1 and FIG. 2 shows the housing 40 as comprising a substantially rigid cylinder 41 having a flange 42, and a cylindrical bore 43. The housing cylindrical bore 43 is open at the housing flange 42 and the housing cylindrical bore 43 is closed at the end opposite the housing flange 42. The outer surface of housing flange 42 provides a housing load support surface 46.

FIG. 1 and FIG. 2 further depicts the work load support 50 as a planar surface substantially rigid to support the work load. The pivot joint 54 is a one-degree of freedom rotational joint rotatable about the first rotational axis. The pivot joint 54 comprises: a stationary slotted link 55, a rotatable tongued link 56, a pivot element 57, and a pivot element bearing 58. The pivot element bearing 58 is attached to the tongue end of the rotatable tongued link 56. The pivot element bearing 58 comprises a rolling element or a sliding element bearing capable of handling both thrust and radial forces. The tongue end of the rotatable tongued link 56 is inserted into the slotted end of the stationary slotted link 55 with the pivot element 57 being inserted through the pivot element bearing 58 and supported by the slotted end of the stationary slotted link 55. The non-slotted end of the stationary slotted link 55 is attached to the housing 40 at the closed end of the housing cylindrical bore 43. The non-tongued end of the rotatable tongued link 56 is attached to the work load support 50. The pivot joint 54 is aligned center of the housing cylindrical bore 43 and center of the work load support 50. The axial axis of the pivot element 57 being the first rotational axis of the pivot joint 54. Thus, the work load support 50 is only rotatable about the first rotational axis of the pivot joint 54.

FIG. 1 and FIG. 2 shows the first axial cam 70 as comprising: a cylinder 71 having a flange 72, and a first axial cam surface cylinder 73 extending axially from the first axial cam flange 72. A first axial cam surface 75 is provided by the axial end of the first axial cam surface cylinder 73. The side of the first axial cam flange 72 opposite the first axial cam surface 75 provides a first axial cam load support surface 76. The first axial cam 70 has a bore 77 to provide clearance about the pivot joint 54. The end of the first axial cam cylinder 71 opposite the first axial cam surface 75 is inserted into the open end of the housing cylindrical bore 43. A first thrust bearing 65 resides in contact between the first axial cam load support surface 76 and the housing load support surface 46. The first thrust bearing 65 is either a rolling element bearing or a sliding bearing. A first radial bearing 66 resides in contact between the first axial cam 70 and the housing cylindrical bore 43. The first radial bearing 66 is either a rolling element bearing or a sliding bearing. Thus, the first axial cam 70 is rotatable referenced to the housing 40.

FIG. 1 and FIG. 2 depicts a means for retaining the first axial cam 70 axial force within the housing 40. The first axial cam flange 72 has a shoulder surface 78 encompassing a diameter smaller than the first axial cam surface 75 and larger than the first axial cam bore 77. The stationary slotted link 55 has a shoulder 59 axially aligned with the first axial cam shoulder 78. A cap 60 comprising a substantially rigid cylindrical disc 61 with an outside diameter smaller than the inside diameter of the first axial cam surface 75, and an inside diameter which allows the cap 60 to be secured against the stationary slotted link shoulder 59. A thrust bearing 62 resides in contact between the cap 60 and the first axial cam shoulder surface 78. The cap thrust bearing 62 is either a rolling element bearing or a sliding bearing.

FIG. 1 and FIG. 2 further depicts two first axial cam followers 80 each comprising: a link 81, a rolling element 82, and a rolling element axle 83. Each of the first axial cam follower links 81 are rigidly attached to the work load support 50. Each of the first axial cam follower links 81 extend from the work load support 50 towards the first axial cam surface 75. Each of the first axial cam follower links 81 have a slot on the end opposite the work load support 50. The first axial cam follower rolling elements 82 reside in each of the slots of the first axial cam follower links 81, where the first axial cam rolling element axles 83 are inserted through the center of each of the first axial cam follower rolling elements 82. Ends of the first axial cam rolling element axles 83 are supported by each side of the slot of the first axial cam follower links 81. Each of the first axial cam followers 80 are spaced 180 degrees apart on a circle aligned with the first axial cam surface 75 and aligned perpendicular to the first rotational axis of the pivot joint 54. The rolling element 82 of each first axial cam follower 80 contacts the first axial cam surface 75, 180 degrees apart. The first axial cam surface 75 has a profile where the displacement rise magnitude equals the displacement fall magnitude at any first axial cam surface 75 coordinates 180 apart. Both of the first axial cam followers 80 maintain contact with the first axial cam surface 75 at all times independent of the first axial cam 70 position, thus resulting in a form-closed axial cam-follower arrangement. The first rotational axis of the pivot joint 54 is axially center of the first axial cam 70 profile displacement rise magnitude and displacement fall magnitude.

In FIG. 1 and FIG. 2 the first rotational axis drive unit 86 is mounted to the outside surface of the housing 40 at the closed end of the housing cylindrical bore 43. The first rotational axis drive unit 86 has an output-shaft 87 extending inside the housing cylindrical bore 43 and parallel to the centerline of the first axial cam cylinder 71. The means for coupling rotational energy from the first rotational axis drive unit 86 to the first axial cam 70 is a parallel shaft drive set. The parallel shaft drive set comprising a first rotational axis drive component 92 and a first axial cam driven component 93. The first rotational axis drive component 92 is an external spur gear attached to the first rotational axis drive unit output shaft 87. The first axial cam driven component 93 is an internal spur gear attached to the end of the first axial cam cylinder 71 residing in the housing cylindrical bore 43. The first rotational axis drive component 92 meshes with the first axial cam driven component 93, whereby coupling rotational energy from the first rotational axis drive unit 86 to the first axial cam 70. The first rotational axis drive unit 86 is a rotatory drive unit such as an electric motor, pneumatic motor, or hydraulic motor. The electric motor is the preferred first rotational axis drive unit 86.

Operation—Preferred Embodiment: FIG. 1 and FIG. 2

The manner of using the motion-positioning apparatus 39 for generating rotational movement of the work load about the first rotational axis of the three orthogonal axes system comprises the steps of:
  a) Supporting the work load about the pivot joint 54 where the work load is rotatable about the first rotational axis.
  b) Generating rotational energy by the first rotational axis drive unit 86.
  c) Coupling the rotational energy from the first rotational axis drive unit 86 to the first axial cam 70 through the parallel shaft drive set comprising of the first rotational axis drive component 92 and the first axial cam driven component 93.
  d) Rotating the first axial cam 70 as a result of the coupled rotational energy from the first rotational axis drive unit 86 to the first axial cam 70, whereby the first axial cam surface 75 produces a rise displacement and a fall displacement of equal magnitude, but opposite direction at any two points 180 degrees apart on the first axial cam surface 75.
  e) Displacing the pair of first axial cam followers 80 by the rise displacement and the fall displacement of equal magnitude, and opposite direction, where the first axial cam followers 80 contact the first axial cam surface 75 at two points 180 degrees apart and are aligned perpendicular to the first rotational axis of the pivot joint 54.
  f) Transmitting through the first axial cam followers 80 to the work load the rise displacement and the fall displacement of equal magnitude and opposite direction.
  g) Transforming the rise displacement and the fall displacement of equal magnitude and opposite direction into a work load torque about the pivot joint 54, whereby the work load is rotated about the first rotational axis of the pivot joint 54.

As shown in FIG. 1 and FIG. 2, rotation of the work load about the first rotational axis initiates with the rotation of the first rotational axis drive unit output shaft 87 in either the clockwise direction or counter-clockwise direction viewing the first rotational axis drive output shaft 87 from the work load support 50. Rotation of the first rotational axis drive unit output shaft 87 generates rotational energy which is coupled through the first rotational axis drive component 92 and the first axial cam driven component 93 to the first axial cam 70. Since the first axial cam 70 is rotatable referenced to the housing 40, the generated rotational energy is referenced to the housing 40, and the rotational energy is coupled through the internal gear set comprising the first rotational axis drive component 92 and the first axial cam driven component 93; clockwise rotation of the first rotational axis drive unit output shaft 87 results in clockwise rotation of the first axial cam 70. Likewise, counter-clockwise rotation of the first rotational axis drive unit output shaft 87 results in counter-clockwise rotation of the first axial cam 70.

Rotation of the first axial cam 70 creates displacements of the first axial cam followers 80. Each of the first axial cam followers 80 displacements being of equal magnitude and opposite direction, are transmitted to the work load support 50 through the first axial cam followers 80. Since the first axial cam followers 80 displacements are perpendicular to the first rotational axis of the pivot joint 54 and the pivot joint 54 is center of the first axial cam surface 75 diameter, the first axial cam followers 80 displacements are transformed into a rotational torque of the work load support 50 about the first rotational axis of the pivot joint 54. Thus, the work load is rotated about the first rotational axis of the pivot joint 54.

The relationship between the rotational direction of the first rotational axis drive unit output shaft 87 and the rotation direction of the work load support 50 about the first rotational axis of the pivot joint 54 is dependent on the first axial cam 70 phasing to the first rotational axis of the pivot joint 54. When the first axial cam 70 rise peak is positioned as shown in FIG. 1 and FIG. 2, clockwise rotation of the first rotational axis drive unit output shaft 87 transforms into counter-clockwise rotation of the work load support 50 about the first rotational axis of the pivot joint 54. Likewise, counter-clockwise rotation of the first rotational axis drive unit output shaft 87 transforms into clockwise rotation of the work load support 50 about the first rotational axis of the pivot joint 54. Rotation of the first axial cam 70 by 180 degrees from as shown in FIG. 2, results in clockwise rotation of the work load support 50 about the first rotational axis of the pivot joint 54 when the first rotational axis drive unit output shaft 87 is rotated in the clockwise direction. Likewise, counter-clockwise rotation of the first rotational axis drive unit output shaft 87 transforms into counter-clockwise rotation of the work load support 50 about the first rotational axis of the pivot joint 54.

Figure 3:
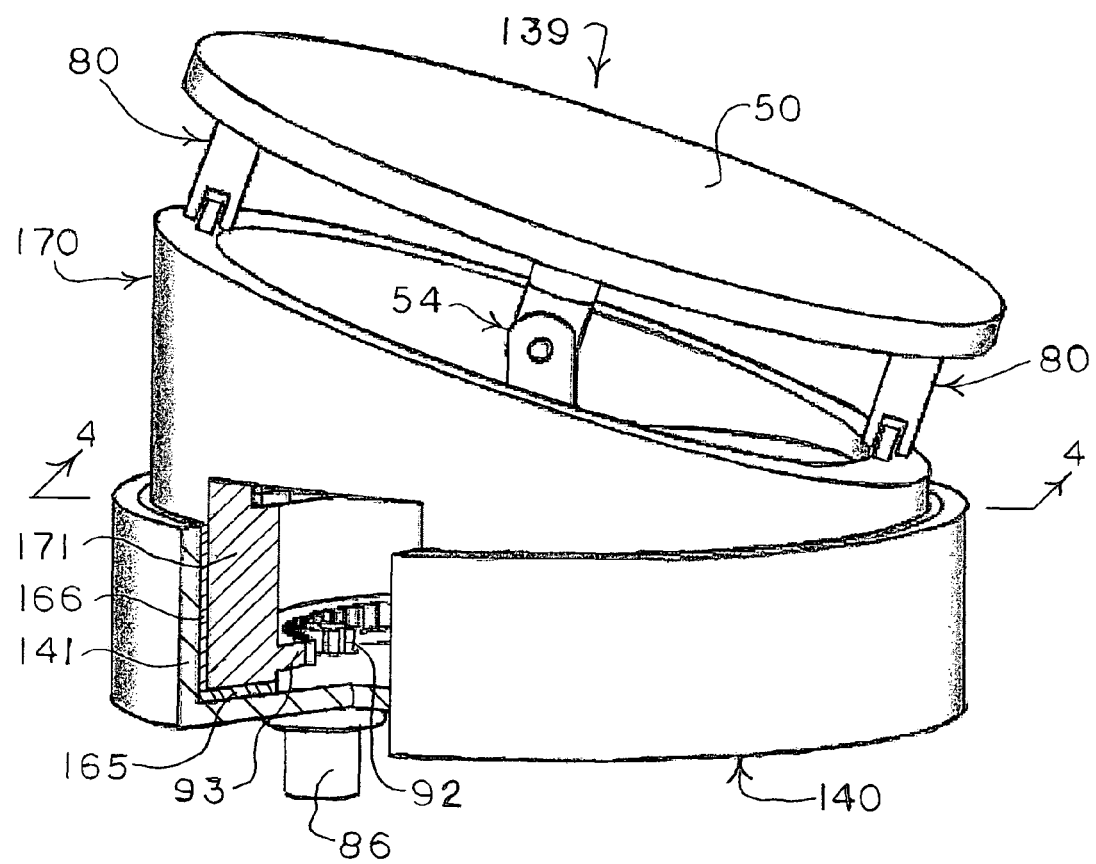
FIG. 3 is a perspective view of a preferred alternate embodiment of the motion-positioning apparatus of FIG. 1 showing an alternate load support surface configuration.
Figure 4:
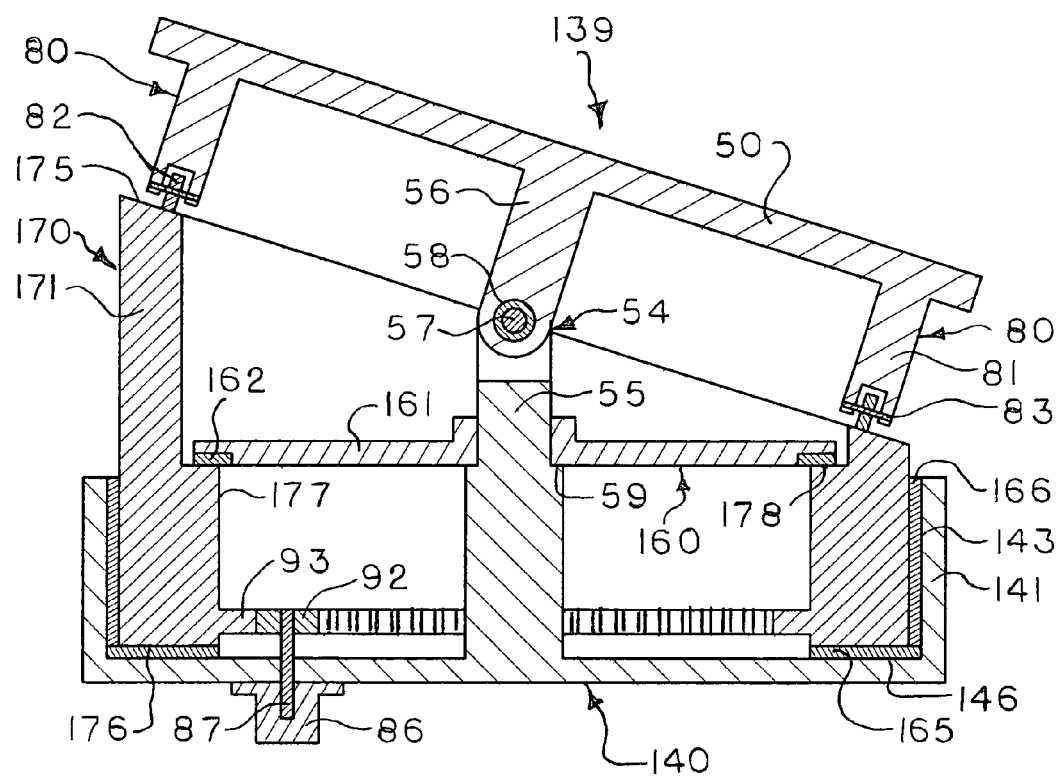
FIG. 4 is a cross-sectional view of the motion-positioning apparatus at line 4-4 of FIG. 3.

Detailed Description—Alternate Embodiment: FIG. 3 and FIG. 4

FIG. 3 and FIG. 4 show an alternate embodiment of a motion-positioning apparatus 139 where the load support surfaces of the housing and first axial cam are reconfigured from as shown in FIG. 1 and FIG. 2. FIG. 3 and FIG. 4 depicts a housing 140 comprising a substantially rigid cylinder 141 having a cylindrical bore 143. The housing cylindrical bore 143 is closed at one end. A housing load support surface 146 is provided by the closed end of the housing cylindrical bore 143.

The work load support 50 and the pivot joint 54 are the same in FIG. 3 and FIG. 4 as described in FIG. 1 and FIG. 2. The stationary slotted link 55 being attached to the closed end of the housing 140 such that the pivot joint 54 is center of the housing cylindrical bore 143. The work load support 50 is attached to the rotatable tongued link 56 such that the work load support is only rotatable about the first rotational axis of the pivot joint 54.

FIG. 3 and FIG. 4 further depicts a first axial cam 170 as comprising a rigid cylinder 171. Opposite axial ends of the first axial cam cylinder 171 are a first axial cam surface 175 and a first axial cam load support surface 176. The first axial cam 170 has a bore 177 to provide clearance about the pivot joint 54. The axial end of the first axial cam cylinder 171 constituting the first axial cam load support surface 176 is inserted into the open end of the housing cylindrical bore 143. A first thrust bearing 165 resides in contact between the first axial cam load support surface 176 and the housing load support surface 146. The first thrust bearing 165 is either a rolling element bearing or a sliding bearing. A first radial bearing 166 resides in contact between the first axial cam cylinder 171 and the housing cylindrical bore 143. The first radial bearing 166 is either a rolling element bearing or a sliding bearing. Thus, the first axial cam 170 is rotatable referenced to the housing 140.

FIG. 3 and FIG. 4 further depicts the means for retaining the first axial cam 170 axial force within the housing 140. The first axial cam cylinder 171 provides a shoulder surface 178 encompassing a diameter smaller than the first axial cam surface 175 and larger than the first axial cam bore 177. A cap 160 comprising a substantially rigid cylindrical disc 161 with an outside diameter smaller than the first axial cam surface 175 diameter, and an inside diameter which allows the cap 160 to be secured against the stationary slotted link shoulder 59. A cap thrust bearing 162 resides in contact between the cap 160 and the first axial cam shoulder surface 178. The cap thrust bearing 162 is either a rolling element bearing or a sliding bearing.

The first axial cam followers 80 are the same in FIG. 3 and FIG. 4 as described in FIG. 1 and FIG. 2. The first axial cam followers 80 are attached to the work load support 50, so the first axial cam follower rolling elements 82 contact the first axial cam surface 175. The first axial cam followers 80 are spaced 180 degrees apart on a circle aligned with the first axial cam surface 175 and aligned perpendicular to the first rotational axis of the pivot joint 54. The first axial cam surface 175 has a profile where the displacement rise magnitude equals the displacement fall magnitude at any first axial cam surface 175 coordinates 180 apart; the same as described in FIG. 1 and FIG. 2, thus resulting in a form-closed axial cam-follower arrangement.

The first rotational axis drive unit 86 and the means for coupling rotational energy from the first rotational axis drive unit 86 to the first axial cam 170 are the same in FIG. 3 and FIG. 4 as described in FIG. 1 and FIG. 2. The first rotational axis drive component 92 is an external spur gear and the first axial cam driven component 93 is an internal spur gear, thus the first rotational axis drive set is a parallel shaft drive set.

Operation—Alternate Embodiment: FIG. 3 and FIG. 4

Operation of the motion-positioning apparatus 139 in FIG. 3 and FIG. 4 is the same as described in FIG. 1 and FIG. 2. FIG. 3 and FIG. 4 shows the work load support 50 rotated in the clockwise direction. The first axial cam 170 is rotated in the counter-clockwise direction by 90 degrees in FIG. 3 and FIG. 4 from the first axial cam 70 as shown in FIG. 1 and FIG. 2.

Alternative Means for Coupling Rotational Energy: FIG. 5-16

FIG. 5-FIG. 16 show alternative versions of means for coupling rotational energy from the first rotational axis drive unit 86 to the first axial cam 70 of FIG. 1 and FIG. 2. The internal spur gear drive set used in FIG. 1 and FIG. 2 is replaced by an alternative drive set selected from the group consisting of parallel shaft drive sets, 90 degree intersecting drive sets, or 90 degree non-intersecting drive sets.

Figure 5:
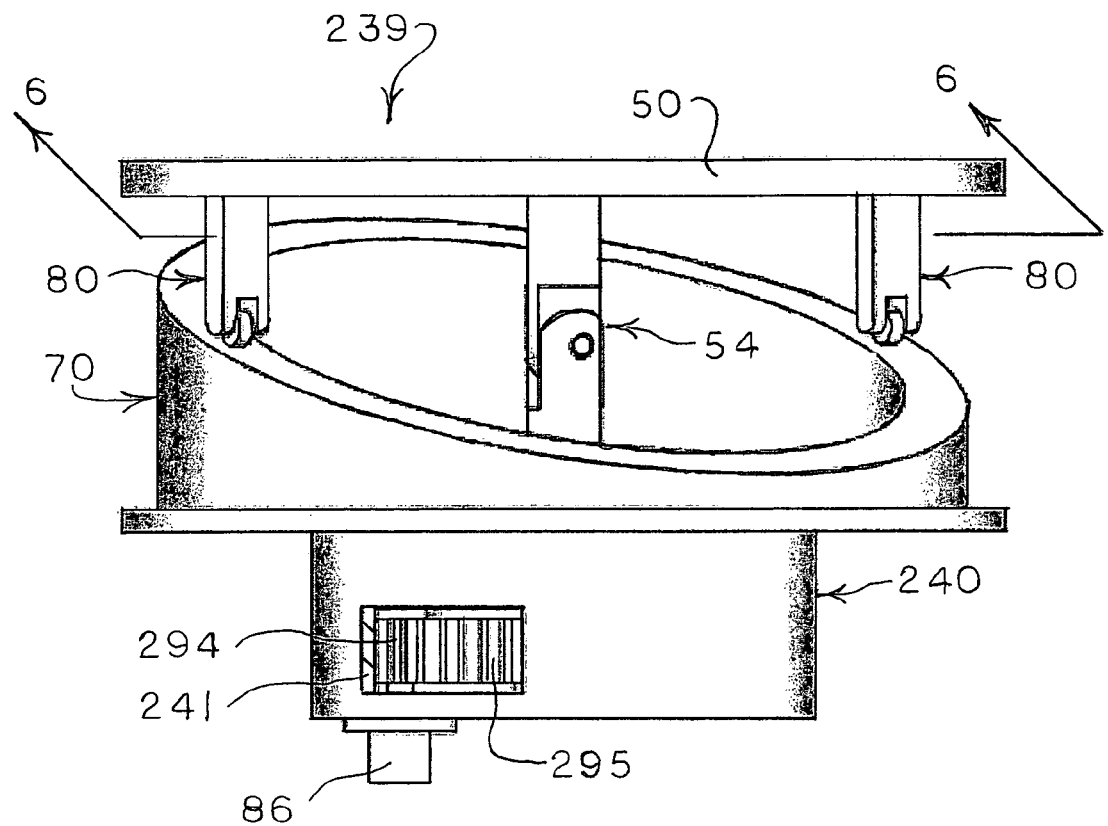
FIG. 5 is a perspective view of an alternate embodiment of the motion-positioning apparatus of FIG. 1 showing means for coupling rotational energy as a parallel shaft drive set.
Figure 6:
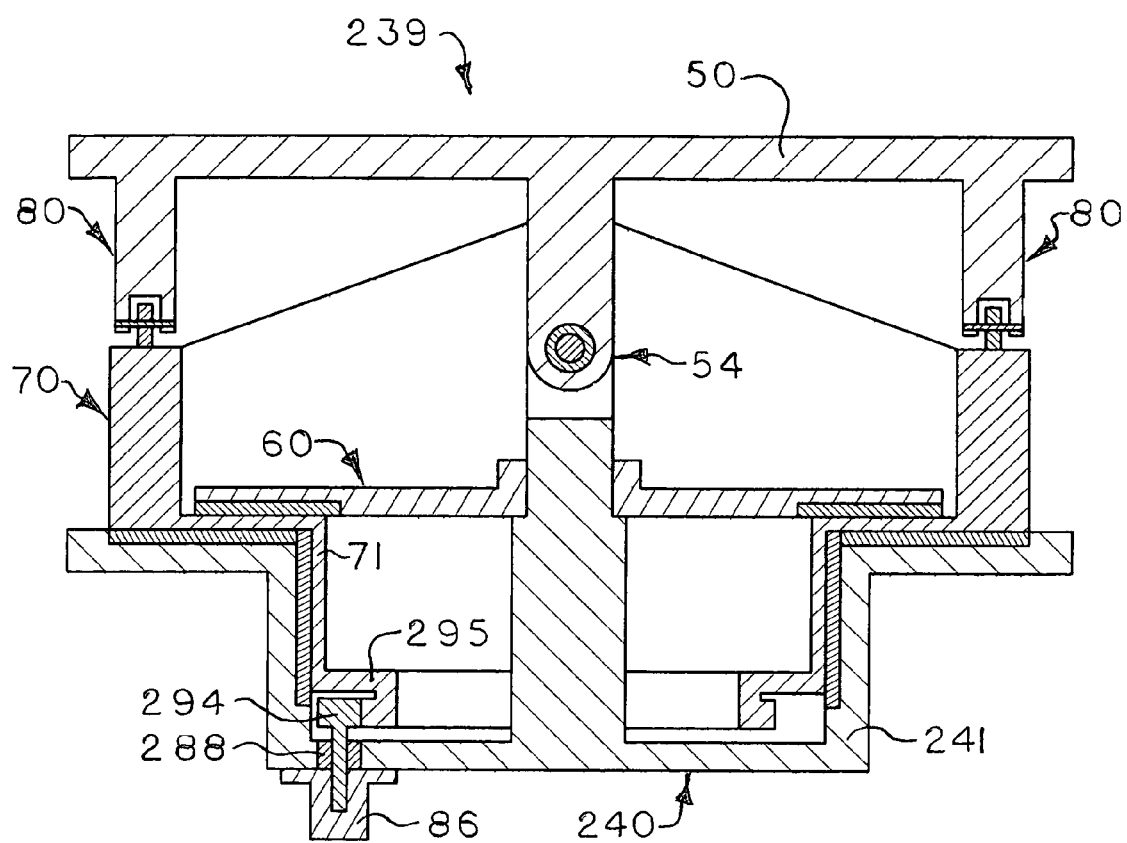
FIG. 6 is a cross-sectional view of the motion-positioning apparatus at line 6-6 of FIG. 5.

Motion-positioning apparatus 239 shown in FIG. 5 and FIG. 6 uses a parallel shaft drive set as an alternative version of the means for coupling rotational energy from the first rotational axis drive unit 86 to the first axial cam 70 of the motion-positioning apparatus 39 shown in FIG. 1 and FIG. 2. Housing 40 in FIG. 1 and FIG. 2 is modified to provide clearance for the first axial cam driven component 295 by extending the closed end of housing 240 as shown in FIG. 5 and FIG. 6. The first axial cam driven component 295 extends inward from the first axial cam cylinder 71 to a lesser diameter to provide space between the inside surface of the housing cylinder 241 and the first axial cam driven component 295 for the first rotational axis drive component 294 to mesh with the first axial cam driven component 295. The first rotational axis drive component 294 is shown in FIG. 6 as being overhung mounted where a first rotational axis overhung bearing 288 is supported by the closed end of housing 240. The shaft of the first rotational axis drive component 294 extends through the first rotational axis overhung bearing 288 such that the output of the first rotational axis drive unit 86 couples with the shaft of the first rotational axis drive component 294. The first rotational axis drive component 294 and first axial cam driven component 295 are selected from the parallel shaft drive sets comprising: an external spur gear set, helical gear set, sprocket-chain set, timing pulley-belt set, pulley-belt set, or any structure presently existing or developed in the future that performs the same function.

Figure 7:
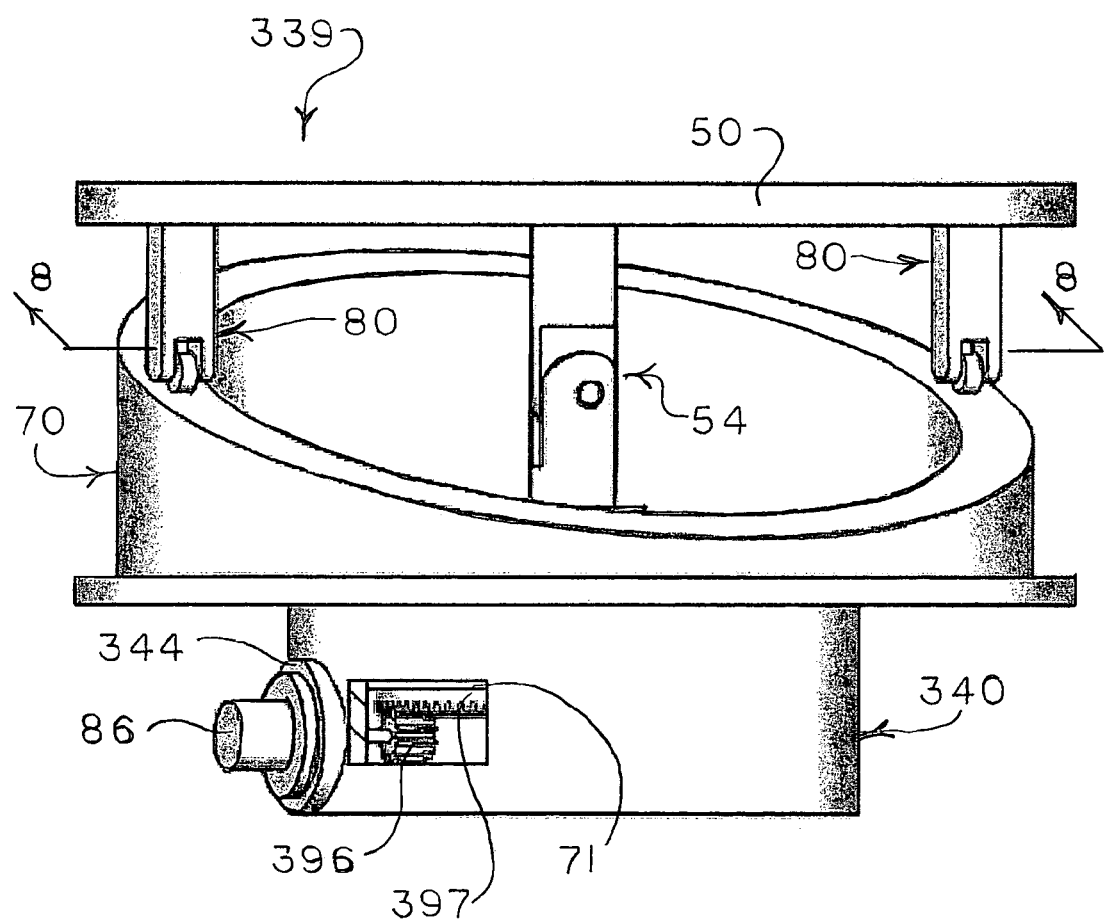
FIG. 7 is a perspective view of an alternate embodiment of the motion-positioning apparatus of FIG. 1 showing means for coupling rotational energy as a 90 degree intersecting drive set.
Figure 8:
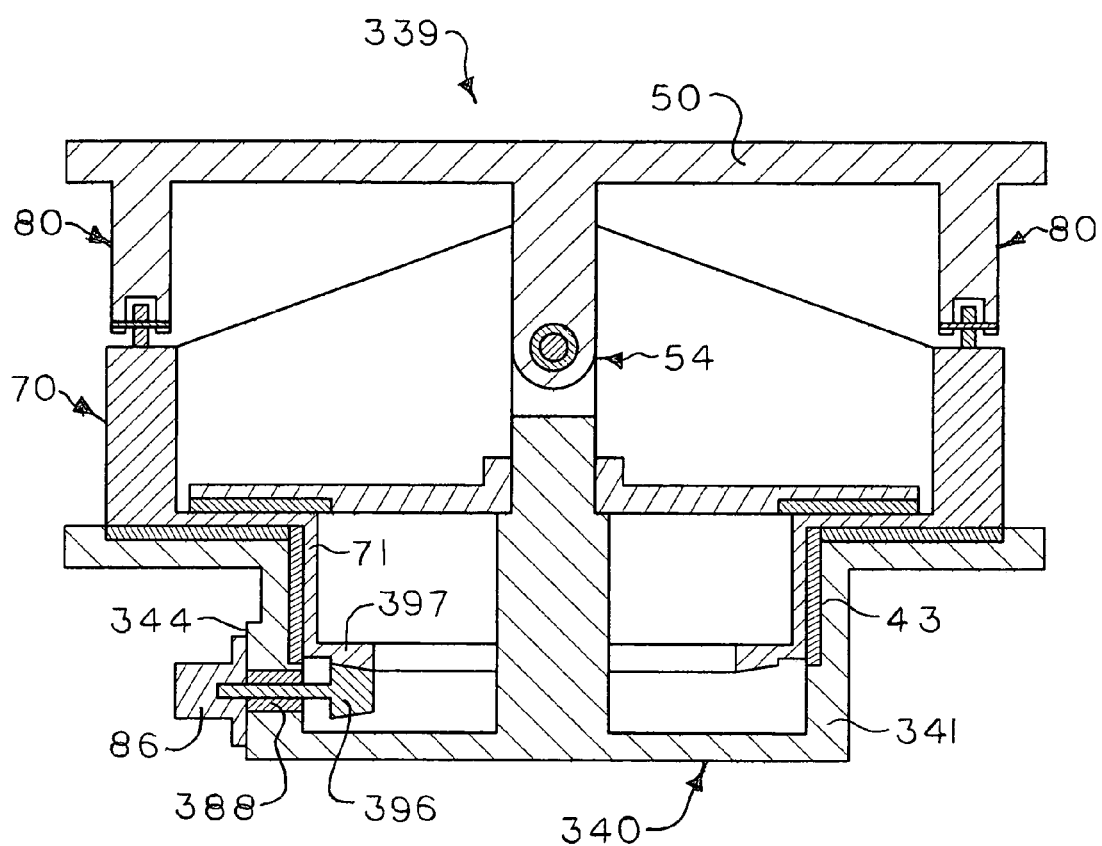
FIG. 8 is a cross-sectional view of the motion-positioning apparatus at line 8-8 of FIG. 7.

Motion-positioning apparatus 339 shown in FIG. 7 and FIG. 8 uses a 90 degree intersecting drive set as an alternative version of the means for coupling rotational energy from the first rotational axis drive unit 86 to the first axial cam 70 of the motion-positioning apparatus 39 shown in FIG. 1 and FIG. 2. The 90 degree intersecting drive set comprises a pinion gear for the first rotational axis drive component 396 and a bevel gear for the first axial cam driven component 397. The first rotational axis drive component 396 and first axial cam driven component 397 are selected from the 90 degree intersecting drive sets comprising: a straight bevel gear set, a spiral bevel gear set, a zerol bevel gear set, or any structure presently existing or developed in the future that performs the same function. Housing 40 in FIG. 1 and FIG. 2 is modified to provide clearance for the first rotational axis drive component 396 by extending the closed end of housing 340 as shown in FIG. 7 and FIG. 8. The first axial cam driven component 397 extends inward from the first axial cam cylinder 71 to a lesser diameter with the teeth of the first axial cam driven component 397 facing the closed end of the housing 340. The housing 340 has a housing boss surface 344 protruding perpendicular from the outer cylinder surface of the housing cylinder 341 such that the centerline of the housing boss surface 344 intersects the centerline of the housing cylindrical bore 43 between the first axial cam driven component 397 end of the first axial cam cylinder 71 and the closed end of the housing 340. The housing cylinder 341 provides support for a first rotational axis overhung bearing 388. The first rotational axis drive component 396 is overhung mounted to the housing cylinder 341 such that the shaft of the first rotational axis drive component 396 and first rotational axis overhung bearing 388 are aligned with the centerline of the housing boss surface 344. Thus, the centerline of the first rotational axis drive component 396 is perpendicular to and intersects the centerline of the first axial cam driven component 397. The first rotational axis drive unit 86 is mounted to the housing boss surface 344 and couples with the shaft of the first rotational axis drive component 396 which extends through the first rotational axis overhung bearing 388. The first rotational axis drive component 396 meshes with the first axial cam driven component 397, thus coupling rotational energy from the first rotational axis drive unit 86 to the first axial cam 70.

Figure 9:
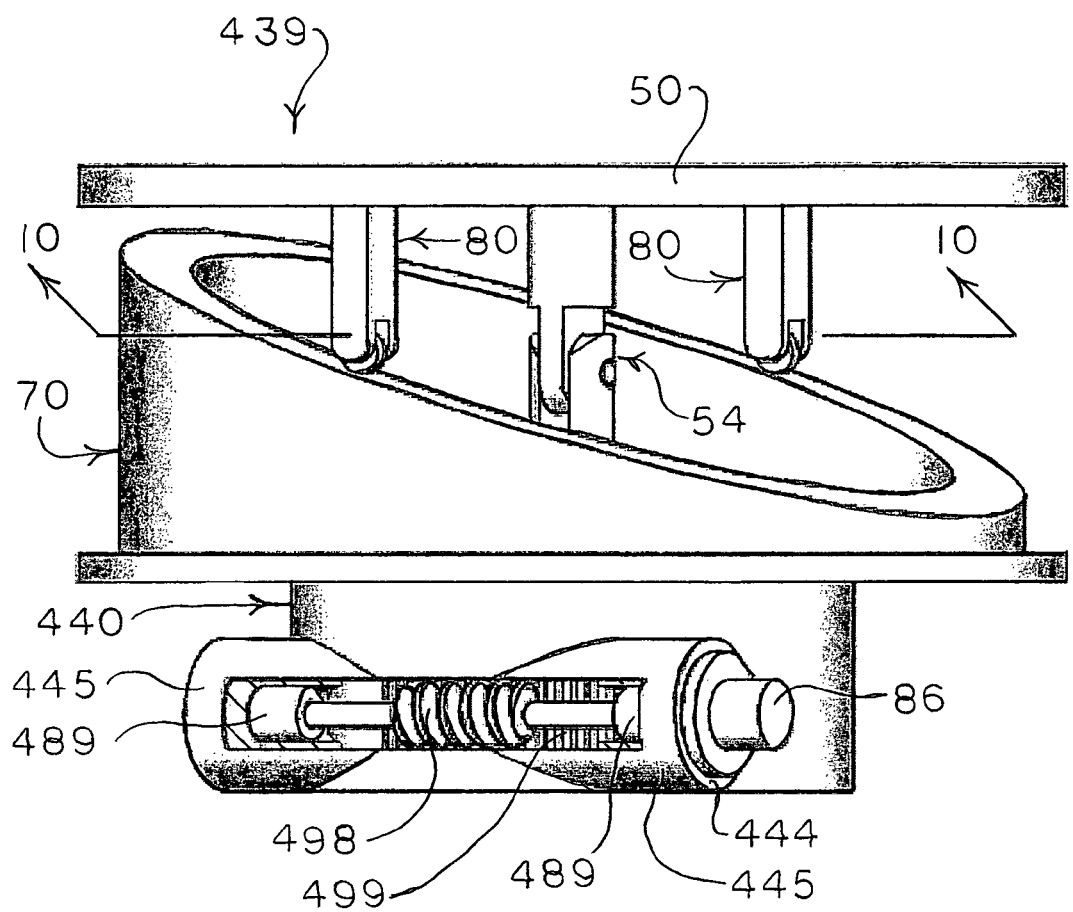
FIG. 9 is a perspective view of an alternate embodiment of the motion-positioning apparatus of FIG. 1 showing means for coupling rotational energy as a 90 degree non-intersecting drive set.
Figure 10:
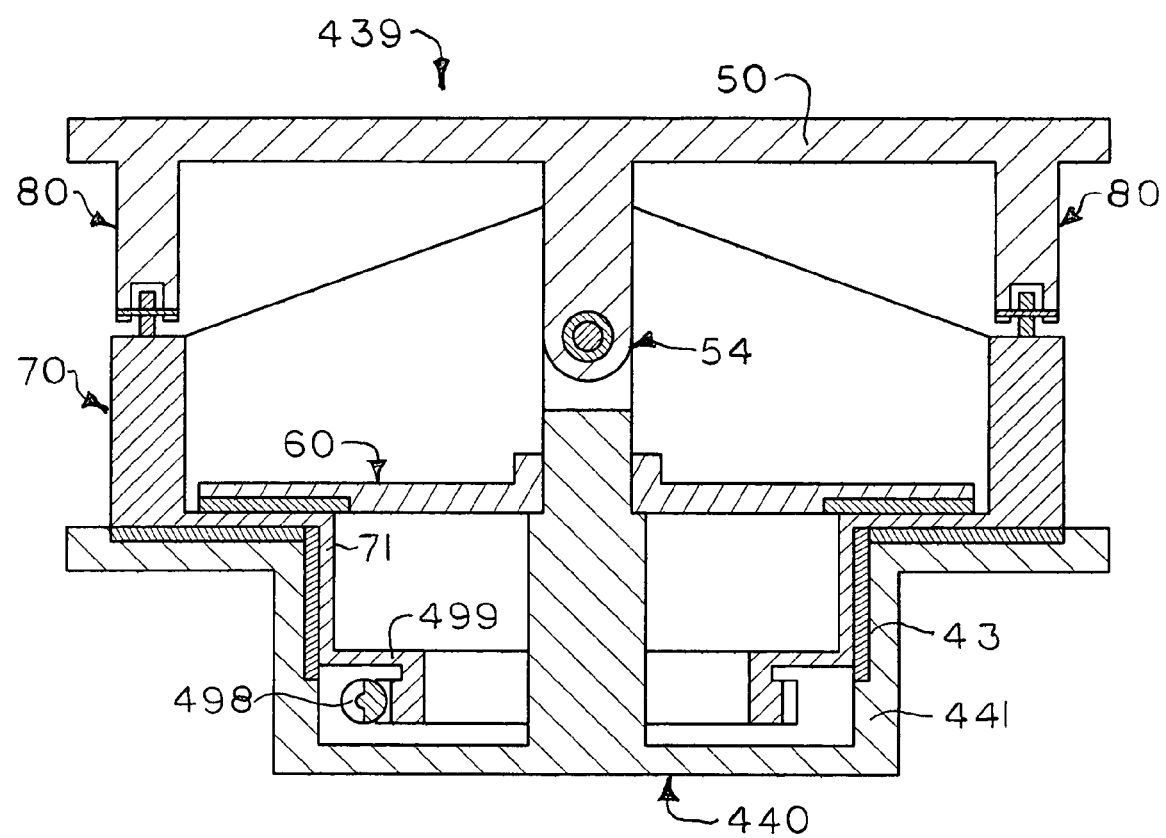
FIG. 10 is a cross-sectional view of the motion-positioning apparatus at line 10-10 of FIG. 9.

Motion-positioning apparatus 439 shown in FIG. 9 and FIG. 10 uses a 90 degree non-intersecting drive set as an alternative version of the means for coupling rotational energy from the first rotational axis drive unit 86 to the first axial cam 70 of the motion-positioning apparatus 39 shown in FIG. 1 and FIG. 2. The 90 degree non-intersecting drive set is selected from drive sets comprising: worm gear sets, cross helical gear sets, hypoid gear sets, or any structure presently existing or developed in the future that performs the same function. FIG. 9 and FIG. 10 shows a worm gear set where the first rotational axis drive component 498 is a worm and the first axial cam driven component 499 is a worm gear. Housing 40 in FIG. 1 and FIG. 2 is modified to provide clearance for the first rotational axis drive component 498 and the first axial cam driven component 499 by extending the closed end of housing 440 as shown in FIG. 9 and FIG. 10. The first axial cam driven component 499 extends inward from the first axial cam cylinder 71 to a lesser diameter with the teeth of the first axial cam driven component 499 projecting radially from the centerline of the housing cylinder 441. The housing 440 has two housing bosses 445 protruding from the outer surface of the housing cylinder 441 such that the centerline of the housing bosses 445 are perpendicular to and offset from the centerline of the housing cylindrical bore 43. Each of the housing bosses 445 are located between the first axial cam driven component 499 end of the first axial cam cylinder 71 and the closed end of the housing 440. Also, each of the housing bosses 445 provide support for a first rotational axis straddle bearing 489. The first rotational axis drive component 498 is straddle mounted between the first rotational axis straddle bearings 489 such that the shaft of the first rotational axis drive component 498 extends through each of the first rotational axis straddle bearings 489. One of the housing bosses 445 has a surface 444 perpendicular to the centerline of the housing boss 445. The first rotational axis drive unit 86 is mounted to the housing boss surface 444 and couples to the shaft of the first rotational axis drive component 498. The first rotational axis drive component 498 meshes with the first axial cam driven component 499, thus coupling rotational energy from the first rotational axis drive unit 86 to the first axial cam 70.

Figure 11:
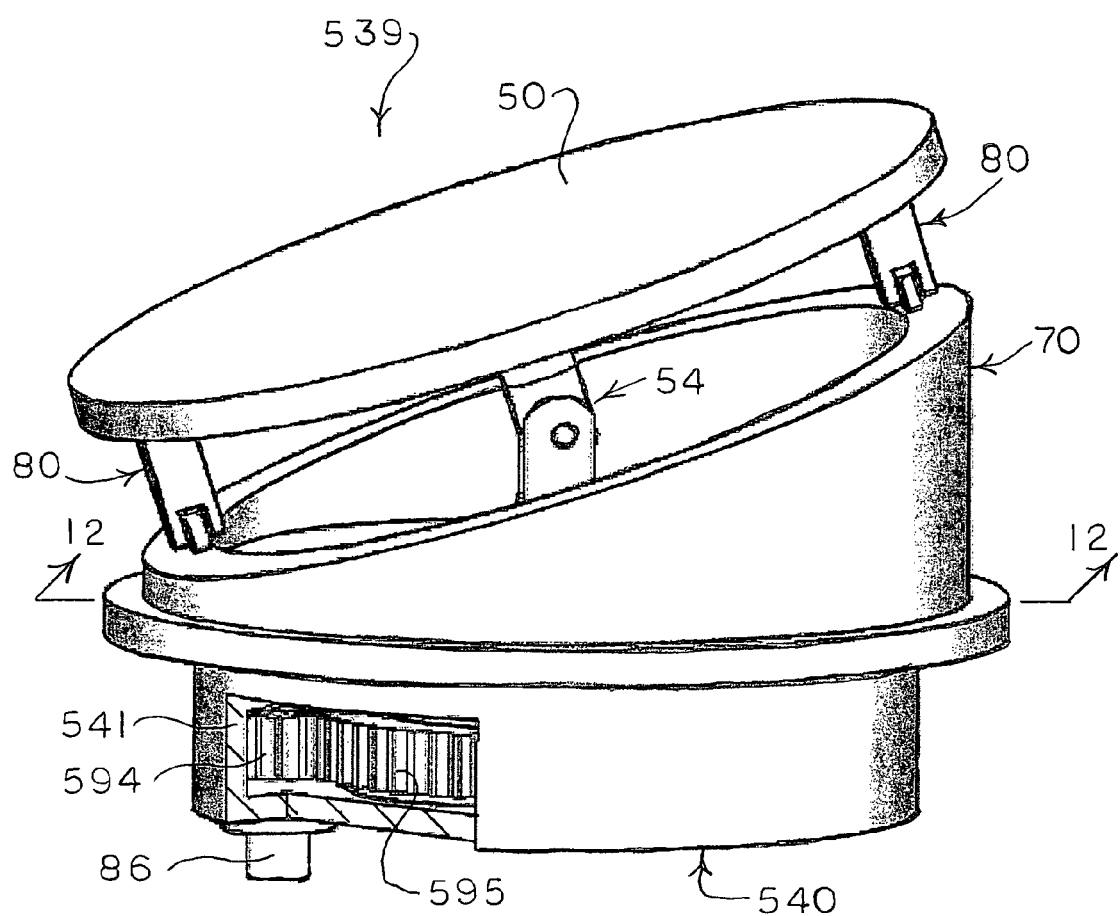
FIG. 11 is a perspective view of a preferred alternate embodiment of the motion-positioning apparatus of FIG. 1 showing means for coupling rotational motion as a parallel shaft drive set.
Figure 12:
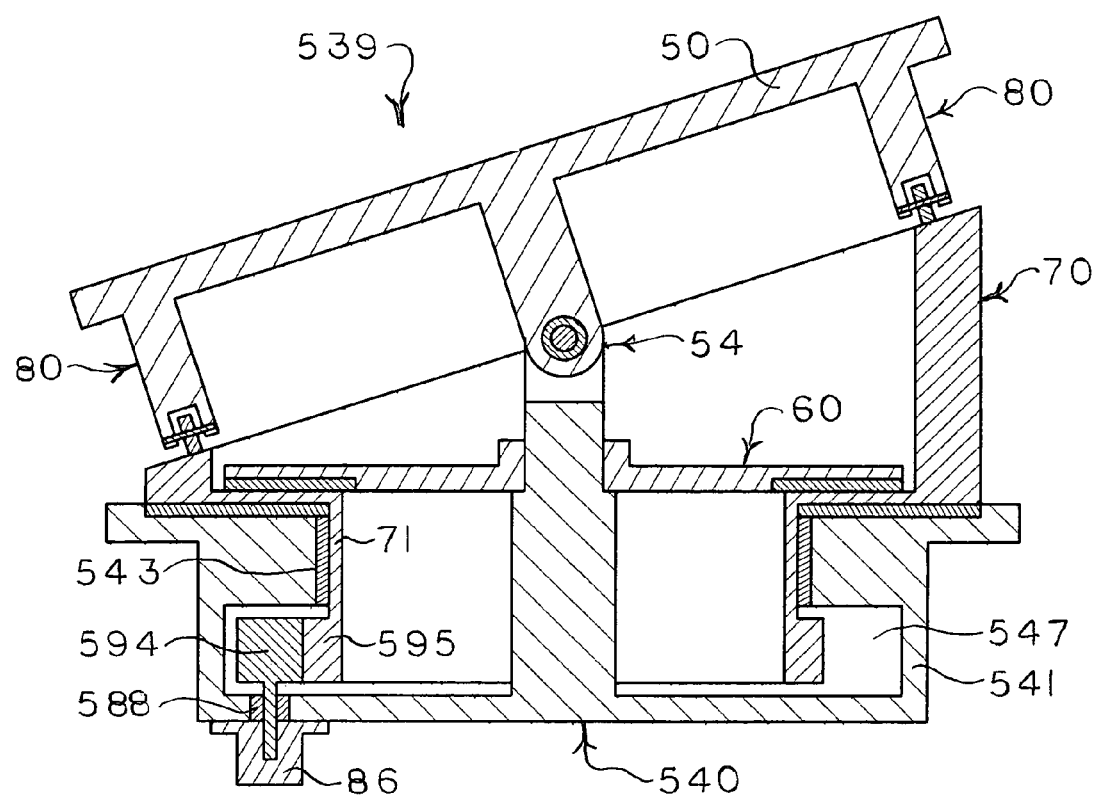
FIG. 12 is a cross-sectional view of the motion-positioning apparatus at line 12-12 of FIG. 11.

Motion-positioning apparatus 539 shown in FIG. 11 and FIG. 12 is a preferred embodiment over that shown in FIG. 5 and FIG. 6 using a parallel shaft drive set as an alternative version of the means for coupling rotational energy from the first rotational axis drive unit 86 to the first axial cam 70 of the motion-positioning apparatus 39 shown in FIG. 1 and FIG. 2. Housing 40 in FIG. 1 and FIG. 2 is modified to provide clearance for the first rotational axis drive component 594 and the first axial cam driven component 595 by expanding the outside diameter of the housing cylinder 541 to support the inclusion of a housing cavity 547 as shown in FIG. 11 and FIG. 12. The housing cavity 547 encircles and adjoins the housing cylindrical bore 543 such that the housing cavity 547 opens onto the housing cylindrical bore 543 between the open and the closed end of the housing cylindrical bore 543. The first axial cam driven component 595 is attached to the outside surface of the first axial cam cylinder 71 such that the first axial cam driven component 595 extends into the housing cavity 547. The first rotational axis drive component 594 resides in the housing cavity 547 and engages the first axial cam driven component 595. The first rotational axis drive component 594 is shown in FIG. 12 as being overhung mounted. A first rotational axis overhung bearing 588 is supported by the closed end of the housing 540. The shaft of the first rotational axis drive component 594 extends through the first rotational axis overhung bearing 588 such that the output of the first rotational axis drive unit 86 couples with the shaft of the first rotational axis drive component 594. The first rotational axis drive component 594 and first axial cam driven component 595 are selected from the parallel shaft drive sets comprising: an external spur gear set, helical gear set, sprocket-chain set, timing pulley-belt set, pulley-belt set, or any structure presently existing or developed in the future that performs the same function. The first axial cam 70 in FIG. 11 and FIG. 12 is rotated in the clockwise direction by 90 degrees from as shown in FIG. 1 and FIG. 2, thus rotating the work load support 50 in the counter-clockwise direction.

Figure 13:
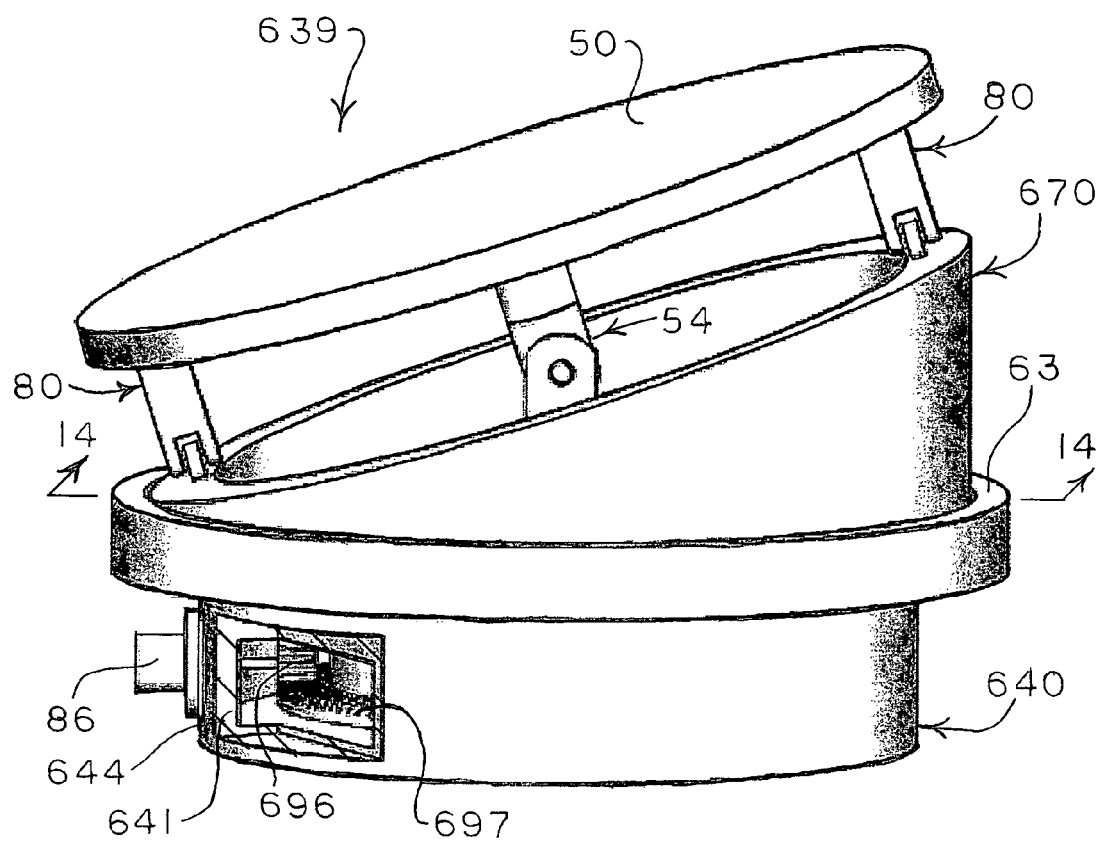
FIG. 13 is a perspective view of a preferred alternate embodiment of the motion-positioning apparatus of FIG. 1 showing means for coupling rotational motion as a 90 degree intersecting drive set.
Figure 14:
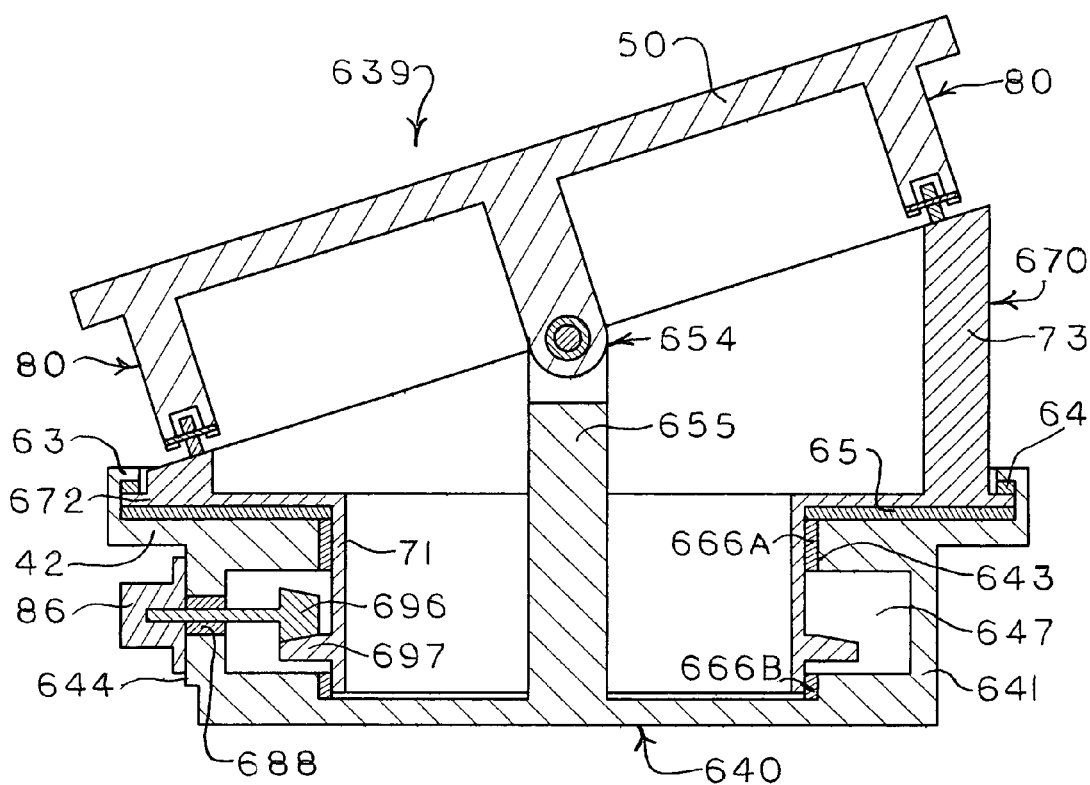
FIG. 14 is a cross-sectional view of the motion-positioning apparatus at line 14-14 of FIG. 13.

Motion-positioning apparatus 639 shown in FIG. 13 and FIG. 14 is a preferred embodiment over that shown in FIG. 7 and FIG. 8 using a 90 degree intersecting drive set as an alternative version of the means for coupling rotational energy from the first rotational axis drive unit 86 to the first axial cam 70 of the motion-positioning apparatus 39 shown in FIG. 1 and FIG. 2. The 90 degree intersecting drive set comprises a pinion gear for the first rotational axis drive component 696 and a bevel gear for the first axial cam driven component 697. The first rotational axis drive component 696 and first axial cam driven component 697 are selected from the 90 degree intersecting drive sets comprising: a straight bevel gear set, a spiral bevel gear set, a zerol bevel gear set, or any structure presently existing or developed in the future that performs the same function. Housing 40 in FIG. 1 and FIG. 2 is modified to provide clearance for the first rotational axis drive component 696 and the first axial cam driven component 697 by expanding the outside diameter of the housing cylinder 641 to support the inclusion of a housing cavity 647 as shown in FIG. 13 and FIG. 14. The housing cavity 647 encircles and adjoins the housing cylindrical bore 643 such that the housing cavity 647 opens onto the housing cylindrical bore 643 between the open and the closed end of the housing cylindrical bore 643. As shown in FIG. 13 and FIG. 14, the surface of the housing cylindrical bore 643 is split by the housing cavity 647 such that the housing radial bearing is split into sections 666A and 666B. The first axial cam driven component 697 is attached to the outside surface of the first axial cam cylinder 71 such that the first axial cam driven component 697 extends into the housing cavity 647. The housing 640 has a housing boss surface 644 protruding perpendicular from the outer surface of the housing cylinder 641 such that the centerline of the housing boss surface 644 is perpendicular to and intersects the centerline of the housing cylindrical bore 643. The housing cylinder 641 provides support for a first rotational axis overhung bearing 688. The first rotational axis drive component 696 is overhung mounted to the housing cylinder 641 such that the shaft of the first rotational axis drive component 696 and first rotational axis overhung bearing 688 are aligned with the centerline of the housing boss surface 644. Thus, the centerline of the first rotational axis drive component 696 is perpendicular to and intersects the centerline of the first axial cam driven component 697. The first rotational axis drive unit 86 is mounted to the housing boss surface 644 and couples with the shaft of the first rotational axis drive component 696 which extends through the first rotational axis overhung bearing 688. The first rotational axis drive component 696 meshes with the first axial cam driven component 697, thus coupling rotational energy from the first rotational axis drive unit 86 to the first axial cam 670.

Figure 15:
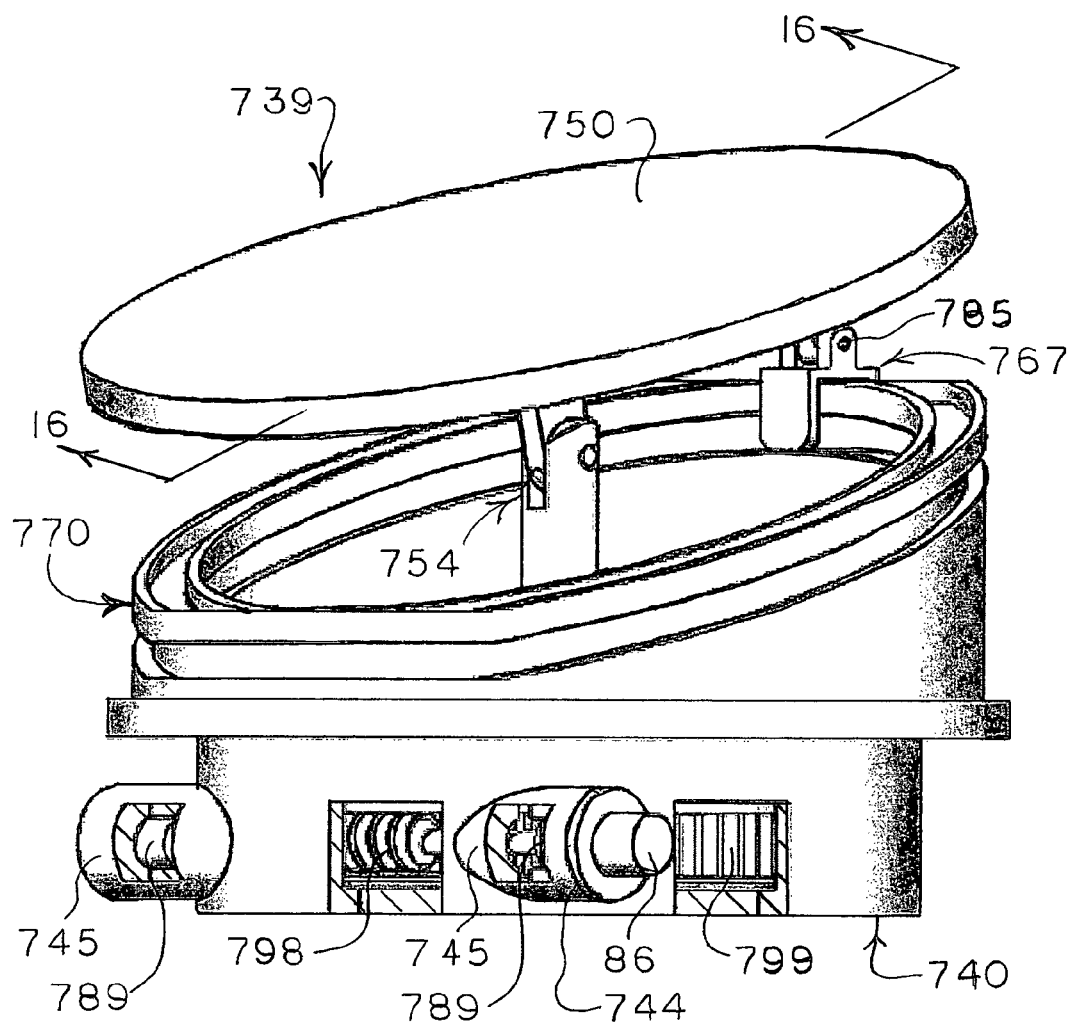
FIG. 15 is a perspective view of a preferred alternate embodiment of the motion-positioning apparatus of FIG. 1 showing a single cam follower configuration and the means for coupling rotational motion as a 90 degree non-intersecting drive set.
Figure 15A:
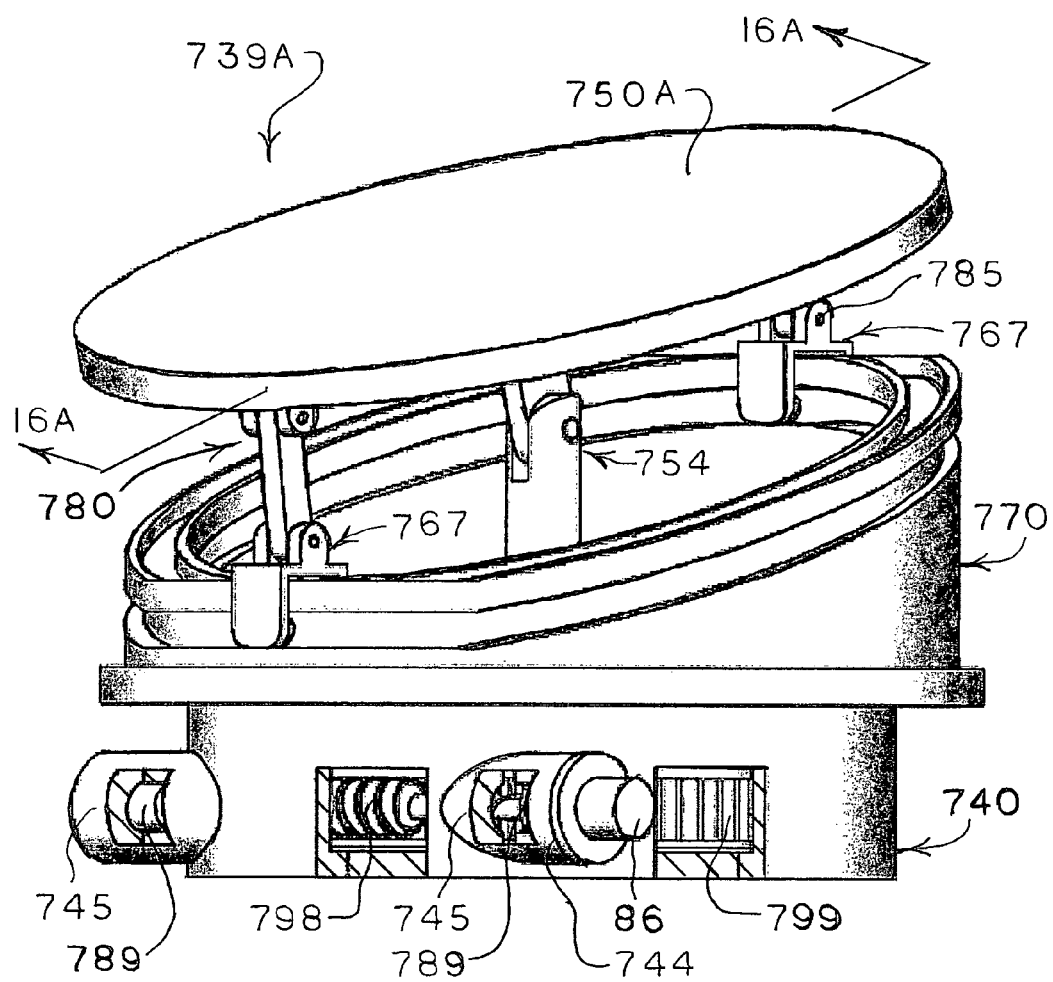
FIG. 15A is a perspective view of a preferred alternate embodiment of the motion-positioning apparatus of FIG. 1 showing a double cam follower configuration and the means for coupling rotational motion as a 90 degree non-intersecting drive set.
Figure 16:
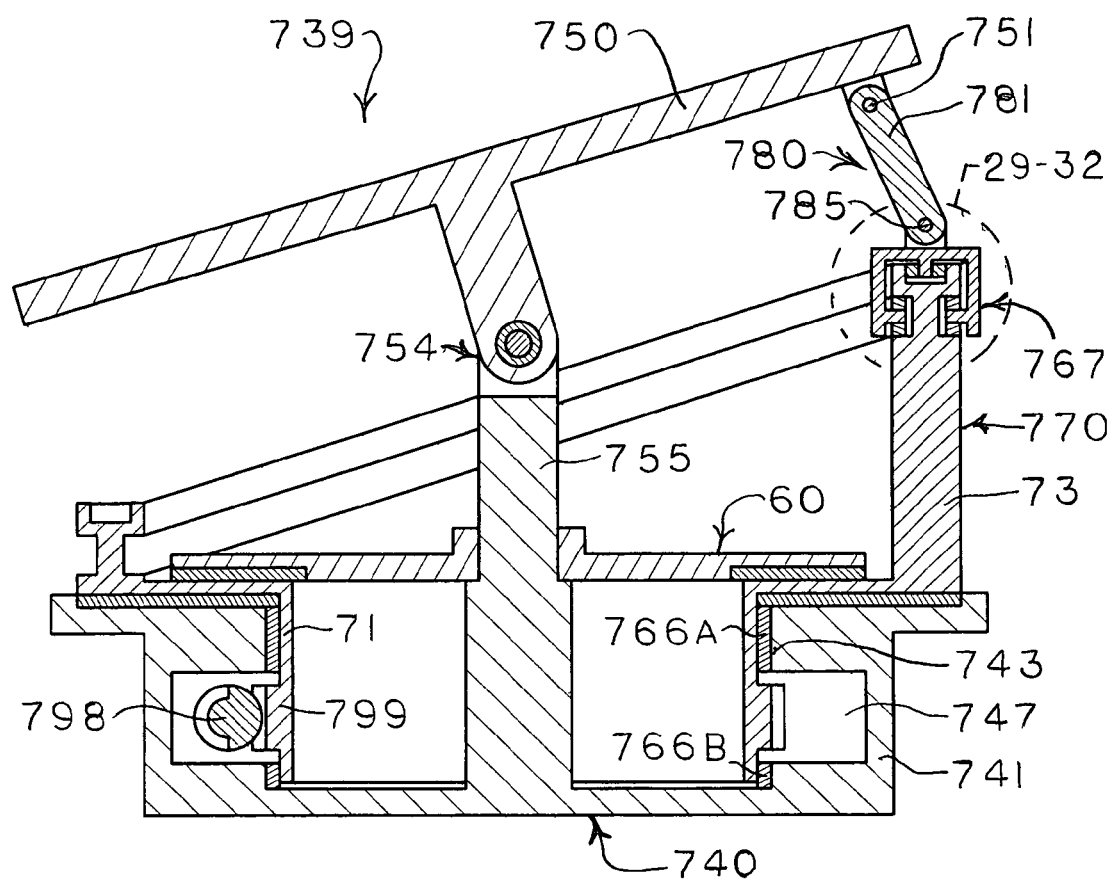
FIG. 16 is a cross-sectional view of the motion-positioning apparatus at line 16-16 of FIG. 15.

Motion-positioning apparatus 739 shown in FIG. 15 and FIG. 16 is a preferred embodiment over that shown in FIG. 9 and FIG. 10 using a 90 degree non-intersecting drive set as an alternative version of the means for coupling rotational energy from the first rotational axis drive unit 86 to the first axial cam 70 of the motion-positioning apparatus 39 shown in FIG. 1 and FIG. 2. The 90 degree non-intersecting drive set is selected from drive sets comprising: worm gear sets, cross helical gear sets, hypoid gear sets, or any structure presently existing or developed in the future that performs the same function. FIG. 15 and FIG. 16 show a worm gear set where the first rotational axis drive component 798 is a worm and the first axial cam driven component 799 is a worm gear. Housing 40 in FIG. 1 and FIG. 2 is modified to provide clearance for the first rotational axis drive component 798 and the first axial cam driven component 799 by expanding the outside diameter of the housing cylinder 741 to support the inclusion of a housing cavity 747 as shown in FIG. 15 and FIG. 16. The housing cavity 747 encircles and adjoins the housing cylindrical bore 743 such that the housing cavity 747 opens onto the housing cylindrical bore 743 between the open and the closed end of the housing cylindrical bore 743. As shown in FIG. 15 and FIG. 16, the surface of the housing cylindrical bore 743 is split by the housing cavity 747 such that the housing radial bearing is split into sections 766A and 766B. The first axial cam driven component 799 is attached to the outside surface of the first axial cam cylinder 71 such that the first axial cam driven component 799 extends into the housing cavity 747. The housing 740 has two housing bosses 745 protruding from the outer surface of the housing cylinder 741 such that the centerline of the housing bosses 745 are perpendicular to and offset from the centerline of the housing cylindrical bore 743. Each of the housing bosses 745 are located between the first axial cam driven component 799 end of the first axial cam cylinder 71 and the closed end of the housing 740. Each of the housing bosses 745 provides support for a first rotational axis straddle bearing 789. The first rotational axis drive component 798 is straddle mounted between the first rotational axis straddle bearings 789 such that the shaft of the first rotational axis drive component 798 extends through each of the first rotational axis straddle bearings 789. One of the housing bosses 745 has a surface 744 perpendicular to the centerline of the housing boss 745. The first rotational axis drive unit 86 is mounted to the housing boss surface 744 and couples to the shaft of the first rotational axis drive component 798. The first rotational axis drive component 798 meshes with the first axial cam driven component 799, thus coupling rotational energy from the first rotational axis drive unit 86 to the first axial cam 770. Motion-positioning apparatus 739A shown in FIG. 15A and FIG. 16A uses the same means for coupling rotational energy from the first rotational axis drive unit 86 to the first axial cam 770 as shown in FIG. 15 and FIG. 16 for motion-positioning apparatus 739.

Alternate Means for Coupling Rotational Energy: FIG. 17-28

FIG. 17-FIG. 28 show alternative versions of means for coupling rotational energy from the first rotational axis drive unit 86 to the first axial cam 170 of FIG. 3 and FIG. 4. The internal spur gear drive set used in FIG. 3 and FIG. 4 is replaced by an alternate drive set selected from the group consisting of parallel shaft drive sets, 90 degree intersecting drive sets, or 90 degree non-intersecting drive sets.

Figure 17:
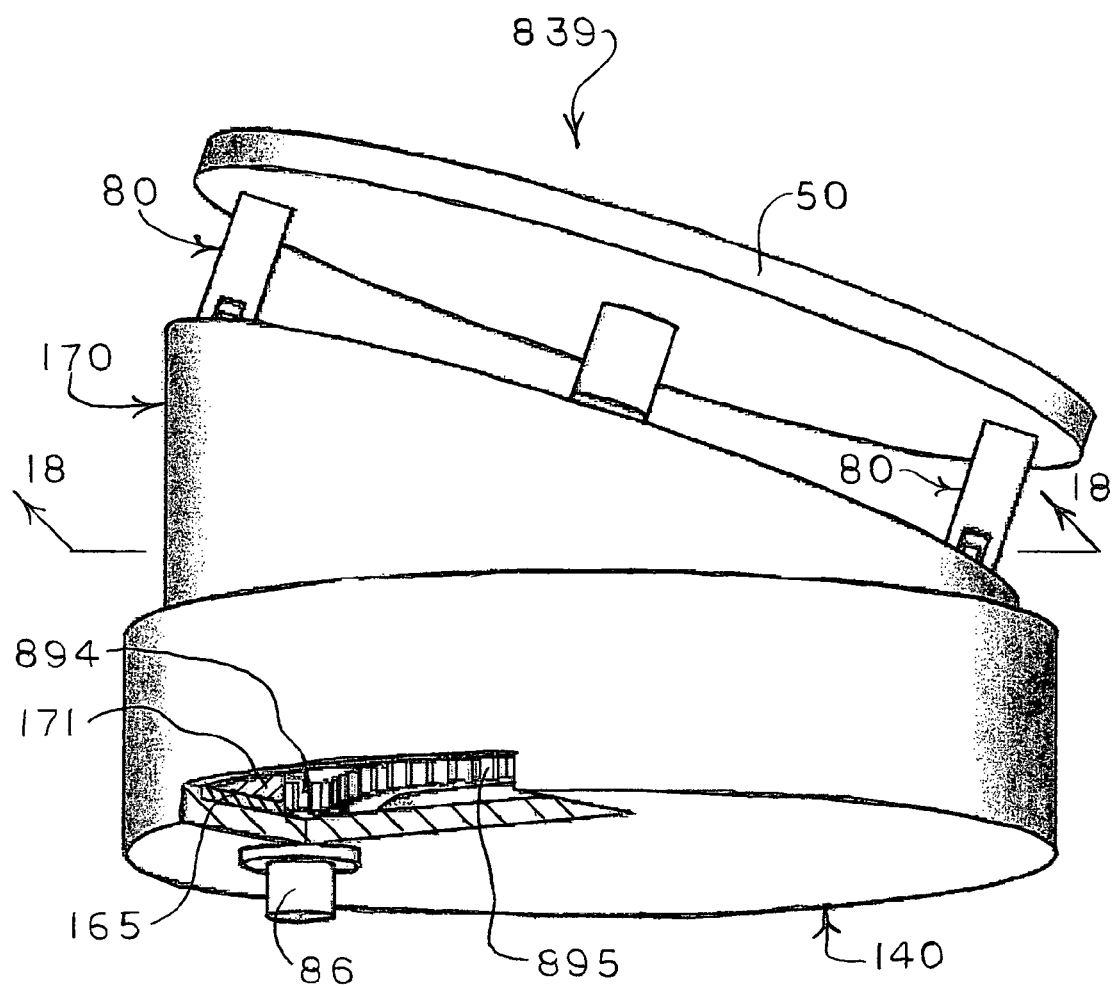
FIG. 17 is a perspective view of an alternate embodiment of the motion-positioning apparatus of FIG. 3 showing means for coupling rotational energy as a parallel shaft drive set.
Figure 18:
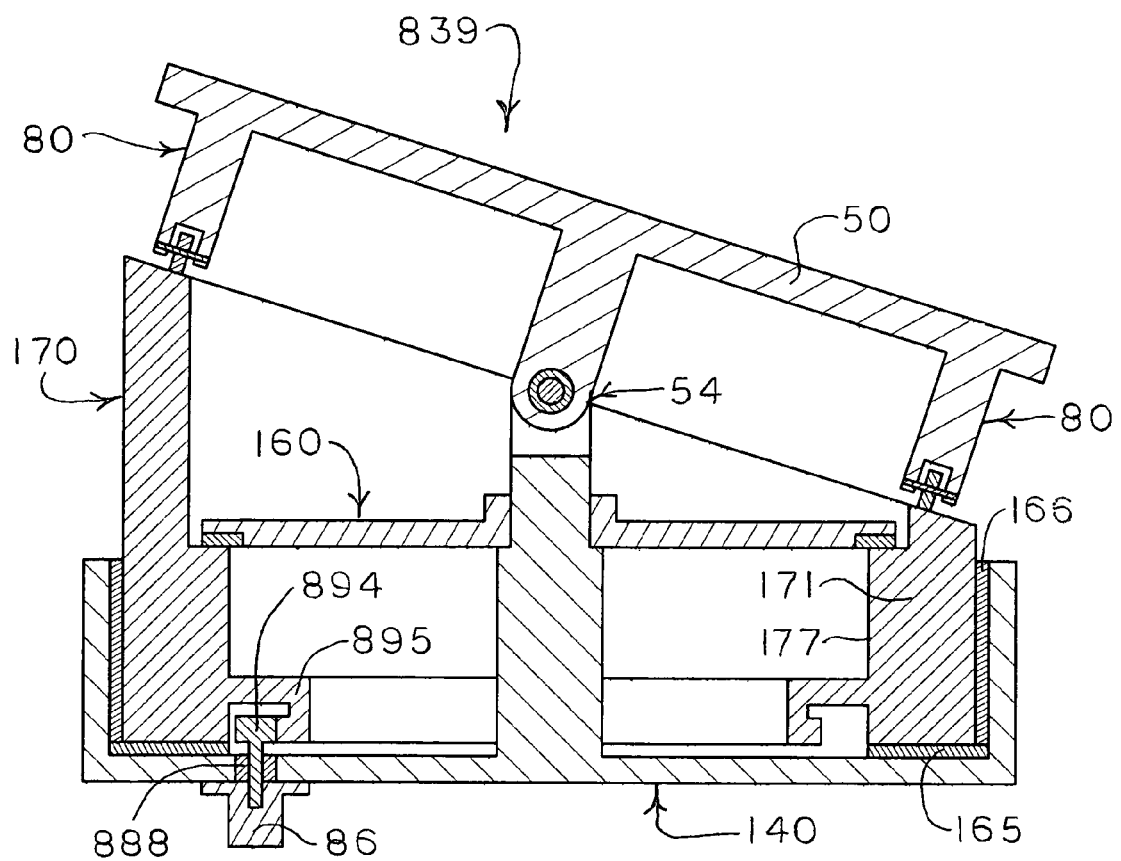
FIG. 18 is a cross-sectional view of the motion-positioning apparatus at line 18-18 of FIG. 17.

Motion-positioning apparatus 839 shown in FIG. 17 and FIG. 18 uses a parallel shaft drive set as an alternative version of the means for coupling rotational energy from the first rotational axis drive unit 86 to the first axial cam 170 of the motion-positioning apparatus 139 shown in FIG. 3 and FIG. 4. The first axial cam driven component 895 extends inward from the first axial cam cylinder 171 to a lesser diameter to provide space between the first axial cam bore 177 and the first axial cam driven component 895 for the first rotational axis drive component 894 to mesh with the first axial cam driven component 895. The first rotational axis drive component 894 is shown in FIG. 18 as being overhung mounted. A first rotational axis overhung bearing 888 is supported by the closed end of housing 140. The shaft of the first rotational axis drive component 894 extends through the first rotational axis overhung bearing 888 such that the output of the first rotational axis drive unit 86 couples with the shaft of the first rotational axis drive component 894. The first rotational axis drive component 894 and first axial cam driven component 895 are selected from the parallel shaft drive sets comprising: an external spur gear set, helical gear set, sprocket-chain set, timing pulley-belt set, pulley-belt set, or any structure presently existing or developed in the future that performs the same function.

Figure 19:
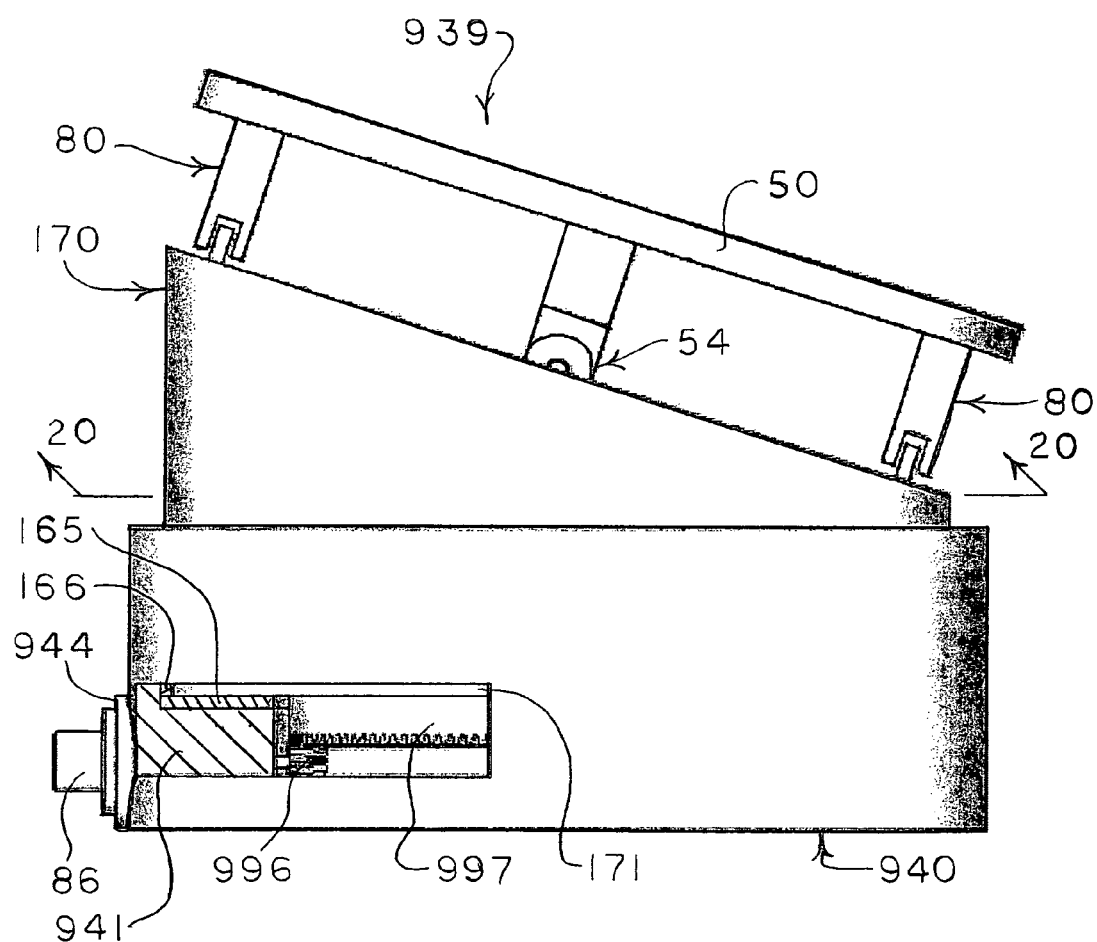
FIG. 19 is a perspective view of an alternate embodiment of the motion-positioning apparatus of FIG. 3 showing means for coupling rotational energy as a 90 degree intersecting drive set.
Figure 20:
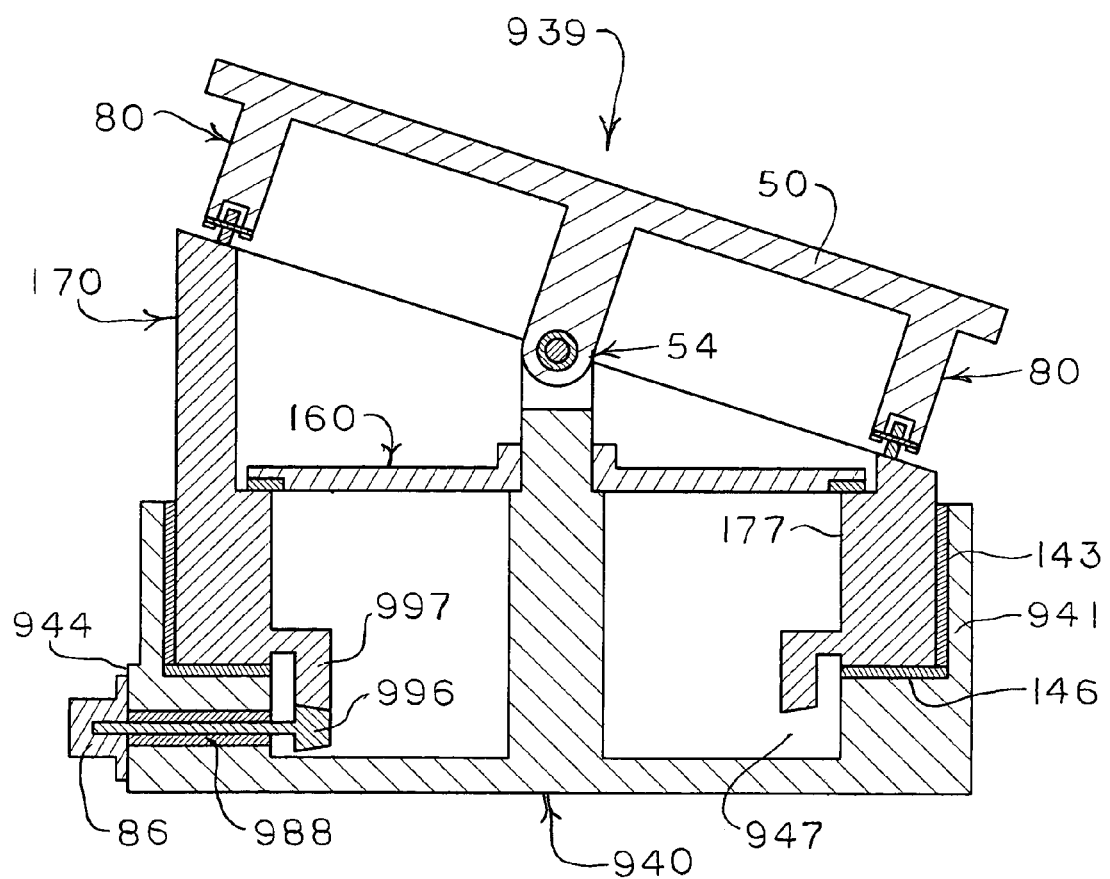
FIG. 20 is a cross-sectional view of the motion-positioning apparatus at line 20-20 of FIG. 19.

Motion-positioning apparatus 939 shown in FIG. 19 and FIG. 20 uses a 90 degree intersecting drive set as an alternative version of the means for coupling rotational energy from the first rotational axis drive unit 86 to the first axial cam 170 of the motion-positioning apparatus 139 shown in FIG. 3 and FIG. 4. The 90 degree intersecting drive set comprises a pinion gear for the first rotational axis drive component 996 and a bevel gear for the first axial cam driven component 997. The first rotational axis drive component 996 and first axial cam driven component 997 are selected from the 90 degree intersecting drive sets comprising: a straight bevel gear set, a spiral bevel gear set, a zerol bevel gear set, or any structure presently existing or developed in the future that performs the same function. The first axial cam driven component 997 is attached to the surface of the first axial cam bore 177 and extending towards the closed end of the housing 940. Housing 140 in FIG. 3 and FIG. 4 is modified by the addition of a housing cavity 947 as shown in FIG. 19 and FIG. 20 to provide clearance for the first rotational axis drive component 996. The housing cavity 947 is the result of extending the closed end of the housing 940 away from the housing load support surface 146 as shown in FIG. 19 and FIG. 20. The housing 940 has a housing boss surface 944 located between the housing load support surface 146 and the closed end of the housing 940. The housing boss surface 944 protrudes perpendicular from the outer surface of the housing cylinder 941 such that the axial centerline of the housing boss surface 944 intersects the centerline of the housing cylindrical bore 143 in the housing cavity 947. The housing cylinder 941 provides support for a first rotational axis overhung bearing 988. The first rotational axis drive component 996 being overhung mounted to the housing cylinder 941 such that the shaft of the first rotational axis drive component 996 and first rotational axis overhung bearing 988 are aligned with the axial centerline of the housing boss surface 944. Thus, the centerline of the first rotational axis drive component 996 is perpendicular to and intersects the centerline of the first axial cam driven component 997. The first rotational axis drive unit 86 is mounted to the housing boss surface 944 and couples with the shaft of the first rotational axis drive component 996 which extends through the first rotational axis overhung bearing 988. The first rotational axis drive component 996 meshes with the first axial cam driven component 997, thus coupling rotational energy from the first rotational axis drive unit 86 to the first axial cam 170.

Figure 21:
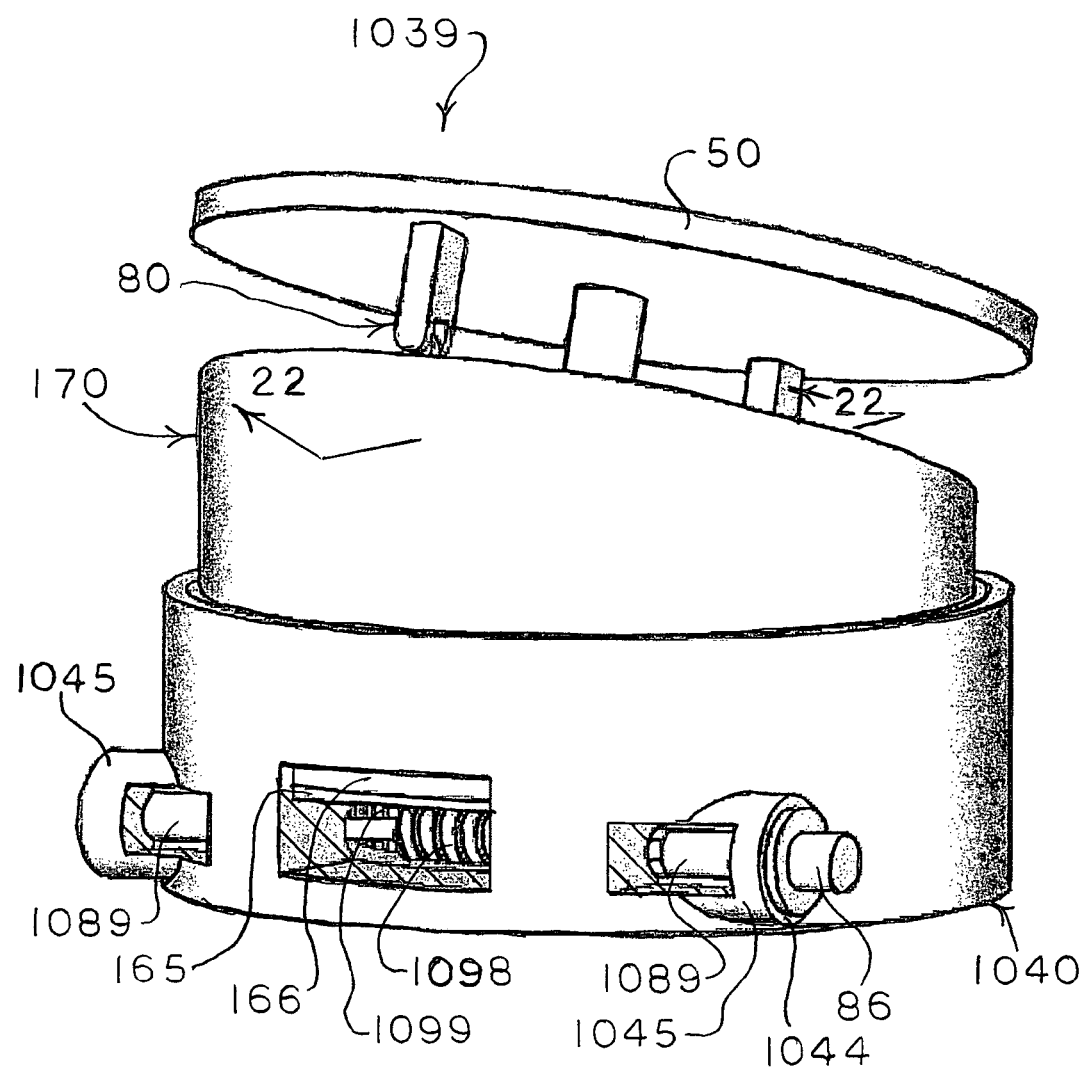
FIG. 21 is a perspective view of an alternate embodiment of the motion-positioning apparatus of FIG. 3 showing means for coupling rotational energy as a 90 degree non-intersecting drive set.
Figure 22:
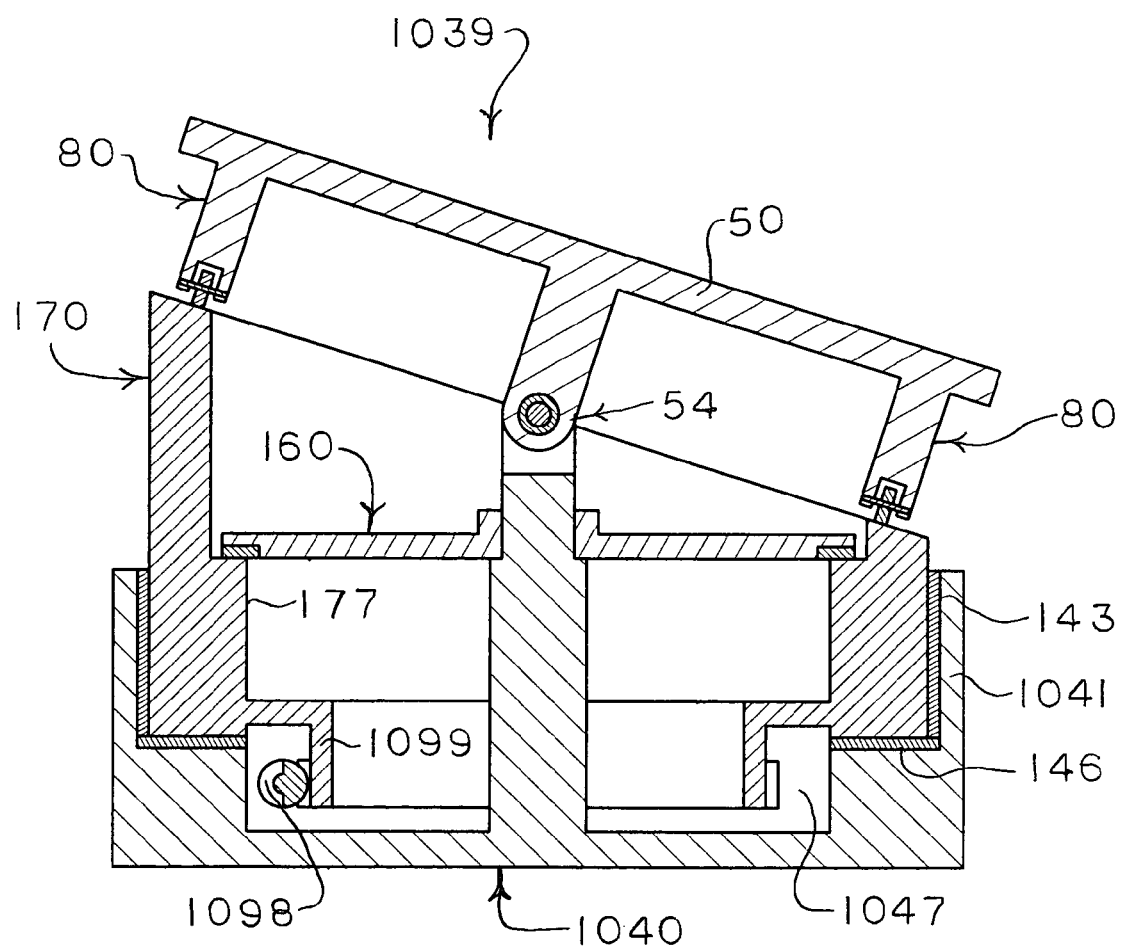
FIG. 22 is a cross-sectional view of the motion-positioning apparatus at line 22-22 of FIG. 21.

Motion-positioning apparatus 1039 shown in FIG. 21 and FIG. 22 uses a 90 degree non-intersecting drive set as an alternative version of the means for coupling rotational energy from the first rotational axis drive unit 86 to the first axial cam 170 of the motion-positioning apparatus 139 shown in FIG. 3 and FIG. 4. The 90 degree non-intersecting drive set is selected from drive sets comprising: worm gear sets, cross helical gear sets, hypoid gear sets, or any structure presently existing or developed in the future that performs the same function. FIG. 21 and FIG. 22 show a worm gear-set where the first rotational axis drive component 1098 is a worm and the first axial cam driven component 1099 is a worm gear. The first axial cam driven component 1099 is attached to the first axial cam bore 177 and extends toward the closed end of the housing 1040, such that the teeth of the first axial cam driven component 1099 project radially towards the housing cylinder 1041 between the housing load support surface 146 and the closed end of the housing 1040. Housing 140 in FIG. 3 and FIG. 4 is modified by the addition of a housing cavity 1047 as shown in FIG. 21 and FIG. 22—to provide clearance for the first rotational axis drive component 1098 and the first axial cam driven component 1099. The housing cavity 1047 is the result of extending the closed end of the housing 1040 away from the housing load support surface 146 as shown in FIG. 21 and FIG. 22. The housing 1040 has two housing bosses 1045 protruding from the outer surface of the housing cylinder 1041 such that the centerline of the housing bosses 1045 are perpendicular to and offset from the centerline of the housing cylindrical bore 143. Each of the housing bosses 1045 provide support for a first rotational axis straddle bearing 1089. The first rotational axis drive component 1098 is straddle mounted between the first rotational axis straddle bearings 1089 such that the shaft of the first rotational axis drive component 1098 extends through each of the first rotational axis straddle bearings 1089. One of the housing bosses 1045 has a housing boss surface 1044 perpendicular to the centerline of the housing boss 1045. The first rotational axis drive unit 86 is mounted to the housing boss surface 1044 and couples to the shaft of the first rotational axis drive component 1098. The first rotational axis drive component 1098 meshes with the first axial cam driven component 1099, thus coupling rotational energy from the first rotational axis drive unit 86 to the first axial cam 170.

Figure 23:
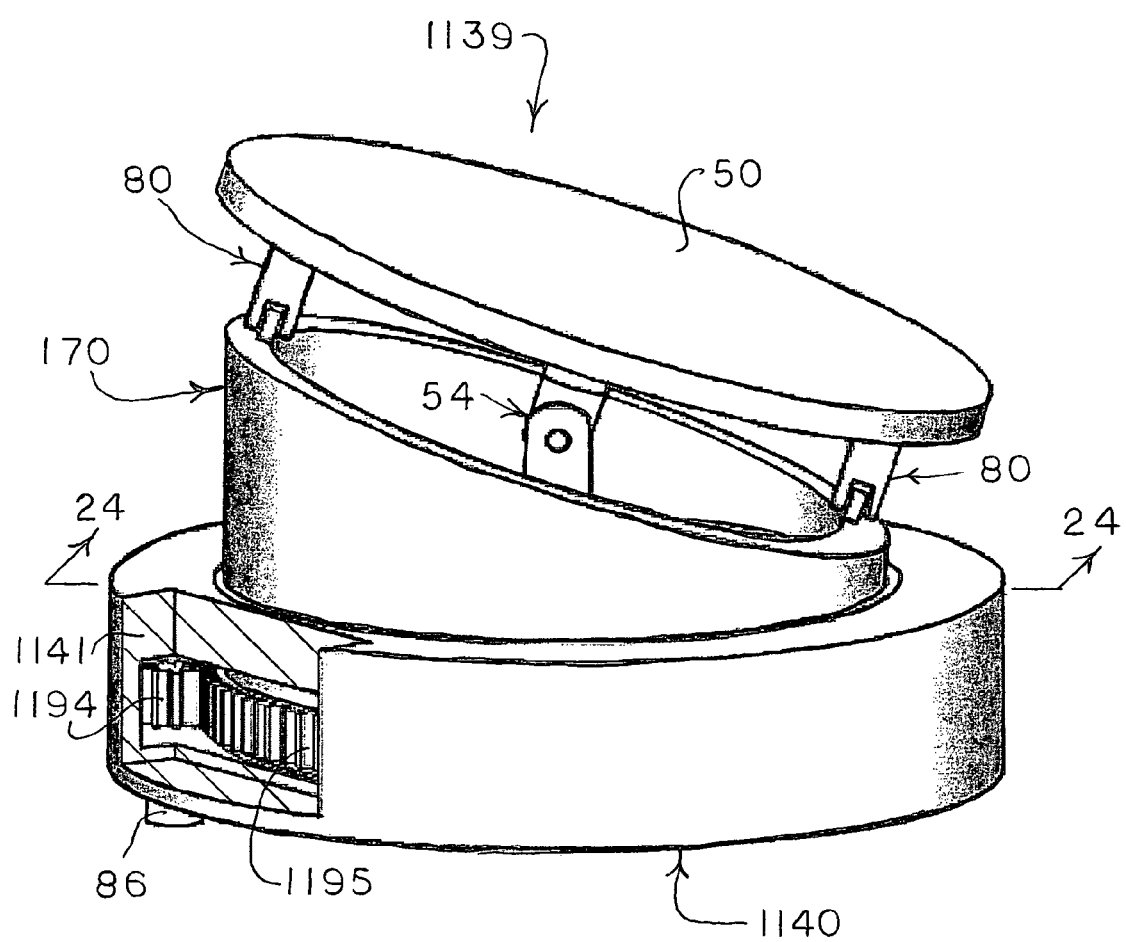
FIG. 23 is a perspective view of a preferred alternate embodiment of the motion-positioning apparatus of FIG. 3 showing means for coupling rotational motion as a parallel shaft drive set.
Figure 24:
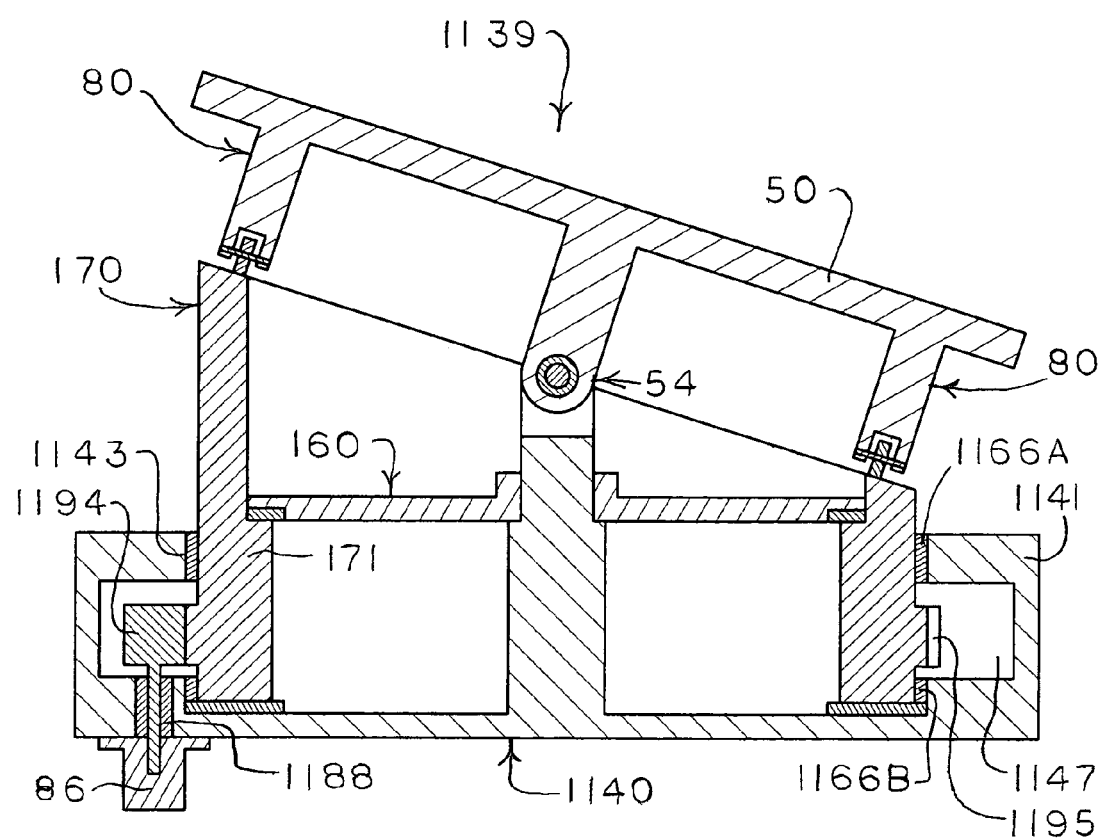
FIG. 24 is a cross-sectional view of the motion-positioning apparatus at line 24-24 of FIG. 23.

Motion-positioning apparatus 1139 shown in FIG. 23 and FIG. 24 is a preferred embodiment over that shown in FIG. 17 and FIG. 18 using a parallel shaft drive set as an alternative version of the means for coupling rotational energy from the first rotational axis drive unit 86 to the first axial cam 170 of the motion-positioning apparatus 139 shown in FIG. 3 and FIG. 4. Housing 140 in FIG. 3 and FIG. 4 is modified to provide clearance for the first rotational axis drive component 1194 and the first axial cam driven component 1195 by expanding the outside diameter of the housing cylinder 1141 to support the inclusion of a housing cavity 1147 as shown in FIG. 23 and FIG. 24. The housing cavity 1147 encircles and adjoins the housing cylindrical bore 1143 such that the housing cavity 1147 opens onto the housing cylindrical bore 1143 between the open and the closed end of the housing cylindrical bore 1143. As shown in FIG. 23 and FIG. 24, the surface of the housing cylindrical bore 1143 is split by the housing cavity 1147 such that the housing radial bearing is split into sections 1166A and 1166B. The first axial cam driven component 1195 is attached to the outside surface of the first axial cam cylinder 171 such that the first axial cam driven component 1195 extends into the housing cavity 1147. The first rotational axis drive component 1194 resides in the housing cavity 1147 and engages the first axial cam driven component 1195. The first rotational axis drive component 1194 is shown in FIG. 24 as being overhung mounted. A first rotational axis overhung bearing 1188 is supported by the closed end of the housing 1140. The shaft of the first rotational axis drive component 1194 extends through the first rotational axis overhung bearing 1188. The first rotational axis drive unit 86 is mounted to the closed end of the housing 1140 such that the output of the first rotational axis drive unit 86 couples with the shaft of the first rotational axis drive component 1194. The first rotational axis drive component 1194 and first axial cam driven component 1195 are selected from a parallel shaft drive sets comprising: an external spur gear set, helical gear set, sprocket-chain set, timing pulley-belt set, pulley-belt set, or any structure presently existing or developed in the future that performs the same function.

Figure 25:
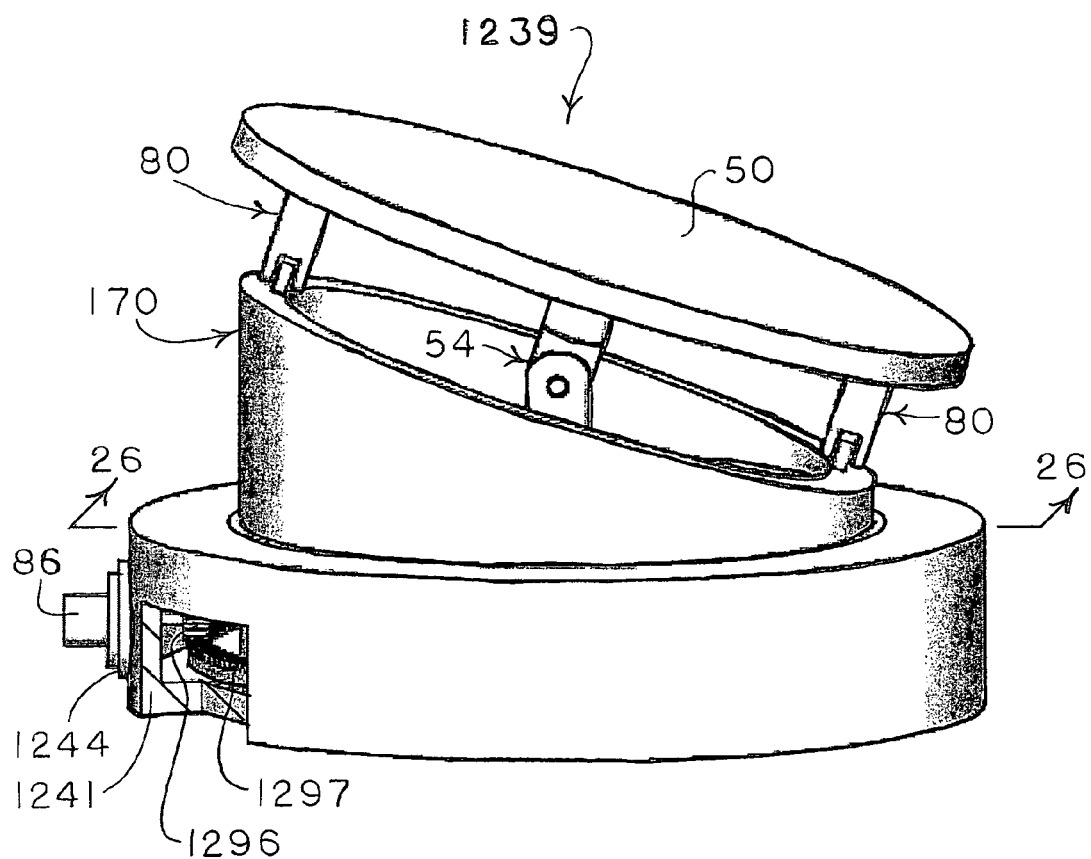
FIG. 25 is a perspective view of a preferred alternate embodiment of the motion-positioning apparatus of FIG. 3 showing means for coupling rotational-motion as a 90 degree intersecting drive set.
Figure 26:
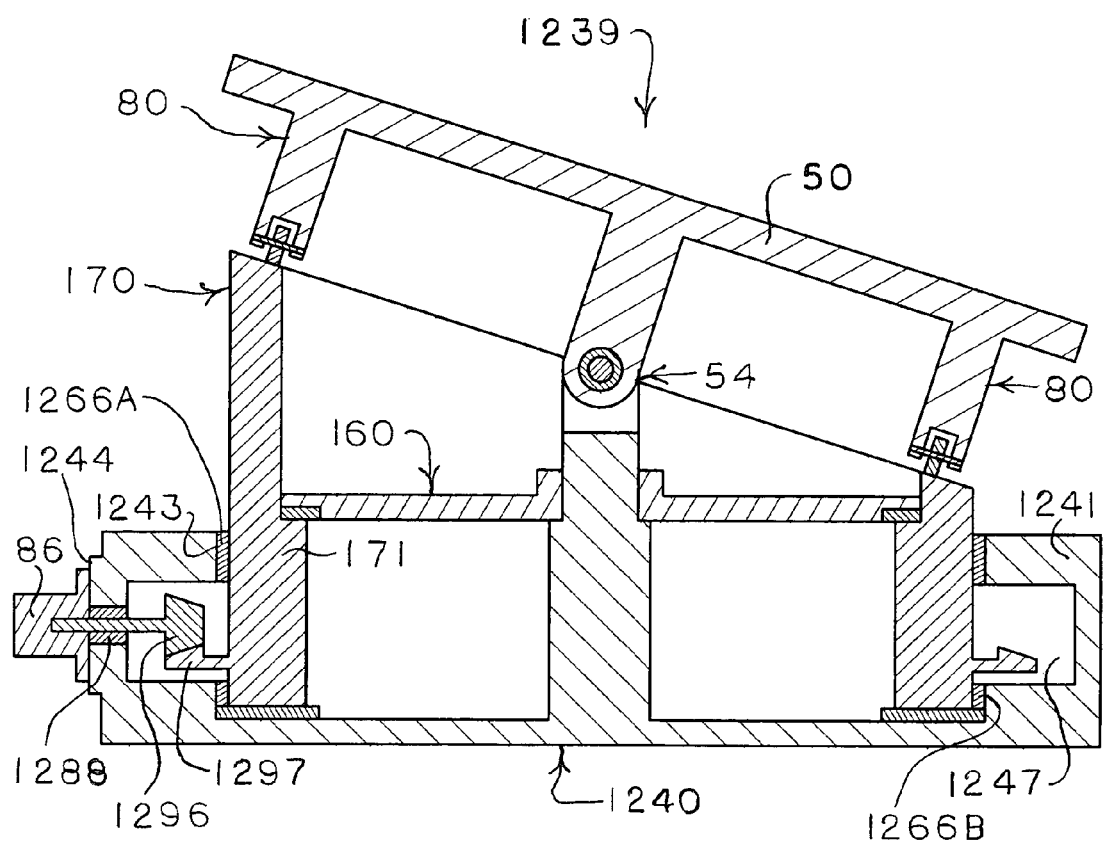
FIG. 26 is a cross-sectional view of the motion-positioning apparatus at line 26-26 of FIG. 25.

Motion-positioning apparatus 1239 shown in FIG. 25 and FIG. 26 is a preferred embodiment over that shown in FIG. 19 and FIG. 20 using a 90 degree intersecting drive set as an alternative version of the means for coupling rotational energy from the first rotational axis drive unit 86 to the first axial cam 170 of the motion-positioning apparatus 139 shown in FIG. 3 and FIG. 4. The 90 degree intersecting drive set comprises a pinion gear for the first rotational axis drive component 1296 and a bevel gear for the first axial cam driven component 1297. The first rotational axis drive component 1296 and first axial cam driven component 1297 are selected from the 90 degree intersecting drive sets comprising: a straight bevel gear set, a spiral bevel gear set, a zerol bevel gear set, or any structure presently existing or developed in the future that performs the same function. Housing 140 in FIG. 3 and FIG. 4 is modified to provide clearance for the first rotational axis drive component 1296 and the first axial cam driven component 1297 by expanding the outside diameter of the housing cylinder 1241 to support the inclusion of a housing cavity 1247 as shown in FIG. 25 and FIG. 26. The housing cavity 1247 encircles and adjoins the housing cylindrical bore 1243 such that the housing cavity 1247 opens onto the housing cylindrical bore 1243 between the open and the closed end of the housing cylindrical bore 1243. As shown in FIG. 25 and FIG. 26, the surface of the housing cylindrical bore 1243 is split by the housing cavity 1247 such that the housing radial bearing is split into sections 1266A and 1266B. The first axial cam driven component 1297 is attached to the outside surface of the first axial cam cylinder 171 such that the first axial cam driven component 1297 extends into the housing cavity 1247. The housing 1240 has a housing boss surface 1244 protruding perpendicular from the outer surface of the housing cylinder 1241 such that the centerline of the housing boss surface 1244 is perpendicular to and intersects the centerline of the housing cylindrical bore 1243. The housing cylinder 1241 provides support for a first rotational axis overhung bearing 1288. The first rotational axis drive component 1296 being overhung mounted to the housing cylinder 1241 such that the shaft of the first rotational axis drive component 1296 and first rotational axis overhung bearing 1288 are aligned with the centerline of the housing boss surface 1244. Thus, the centerline of the first rotational axis drive component 1296 is perpendicular to and intersects the centerline of the first axial cam driven component 1297. The first rotational axis drive unit 86 is mounted to the housing boss surface 1244 and couples with the shaft of the first rotational axis drive component 1296 which extends through the first rotational axis overhung bearing 1288. The first rotational axis drive component 1296 meshes with the first axial cam driven component 1297, thus coupling rotational energy from the first rotational axis drive unit 86 to the first axial cam 170.

Figure 27:
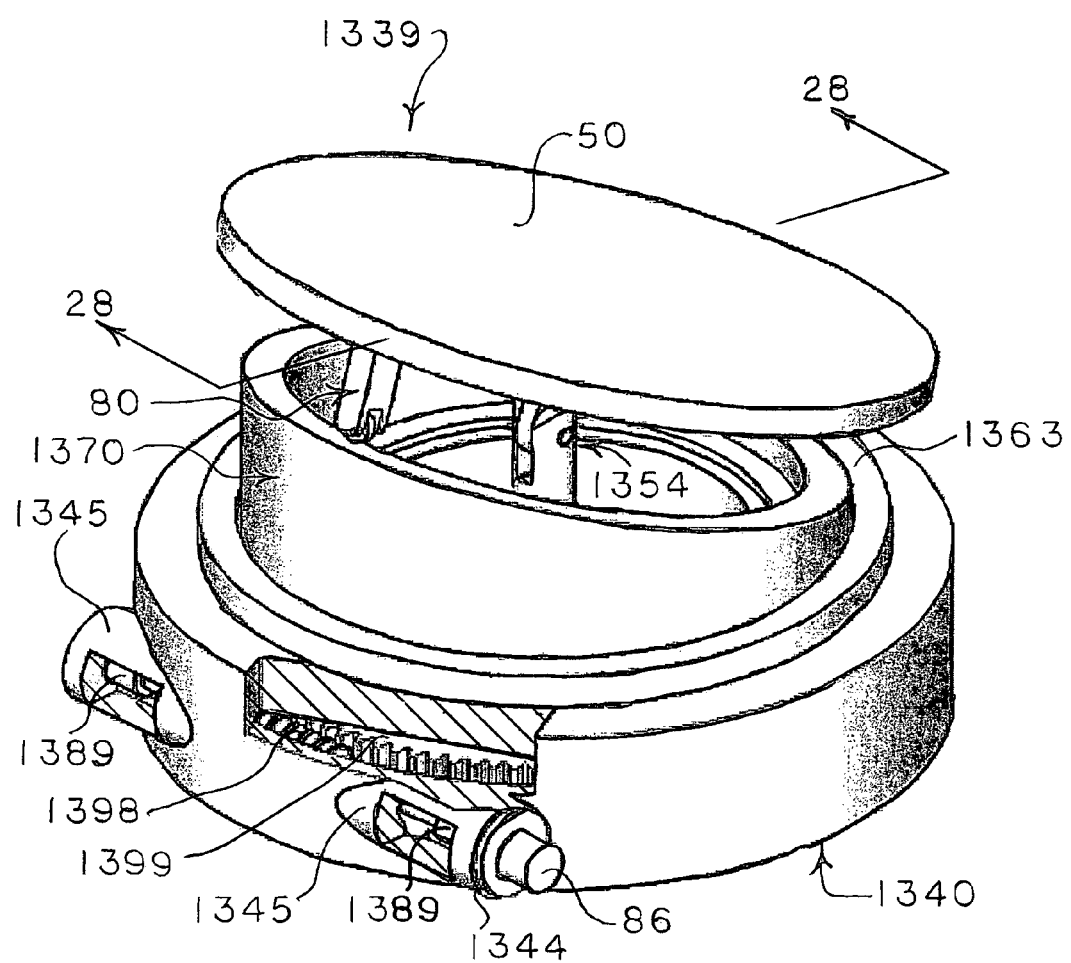
FIG. 27 is a perspective view of a preferred alternate embodiment of the motion-positioning apparatus of FIG. 3 showing means for coupling rotational motion as a 90 degree non-intersecting drive set.
Figure 28:
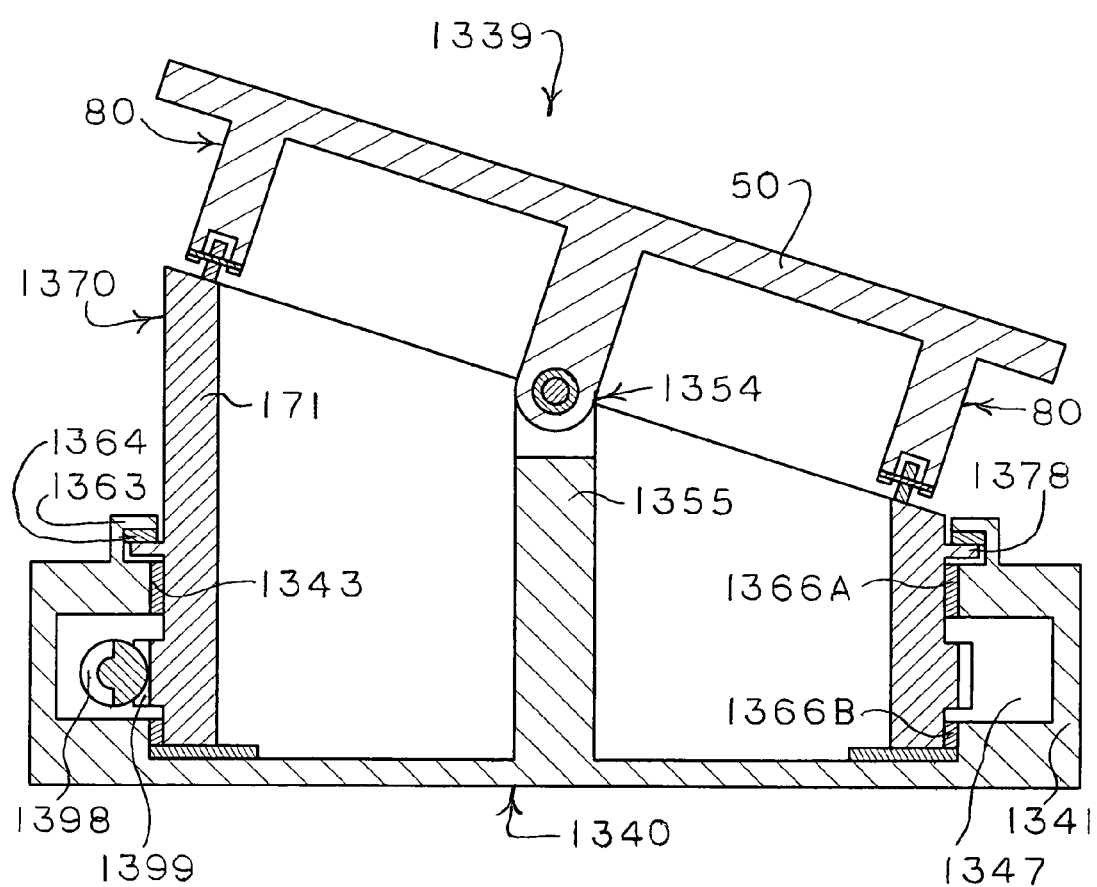
FIG. 28 is a cross-sectional view of the motion-positioning apparatus at line 28-28 of FIG. 27.

Motion-positioning apparatus 1339 shown in FIG. 27 and FIG. 28 is a preferred embodiment over that shown in FIG. 21 and FIG. 22 using a 90 degree non-intersecting drive set as an alternative version of the means for coupling rotational energy from the first rotational axis drive unit 86 to the first axial cam 170 of the motion-positioning apparatus 139 shown in FIG. 3 and FIG. 4. The 90 degree non-intersecting drive set is selected from drive sets comprising: worm gear sets, cross helical gear sets, hypoid gear sets, or any structure presently existing or developed in the future that performs the same function. FIG. 27 and FIG. 28 show a worm gear set where the first rotational axis drive component 1398 is a worm and the first axial cam driven component 1399 is a worm gear. Housing 140 in FIG. 3 and FIG. 4 is modified to provide clearance for the first rotational axis drive component 1398 and the first axial cam driven component 1399 by expanding the outside diameter of the housing cylinder 1341 to support the inclusion of a housing cavity 1347 as shown in FIG. 27 and FIG. 28. The housing cavity 1347 encircles and adjoins the housing cylindrical bore 1343 such that the housing cavity 1347 opens onto the housing cylindrical bore 1343 between the open and the closed end of the housing cylindrical bore 1343. As shown in FIG. 27 and FIG. 28, the surface of the housing cylindrical bore 1343 is split by the housing cavity 1347 such that the housing radial bearing is split into sections 1366A and 1366B. The first axial cam driven component 1399 is attached to the outside surface of the first axial cam cylinder 171 such that the first axial cam driven component 1399 extends into the housing cavity 1347. The housing 1340 has two housing bosses 1345 protruding from the outer surface of the housing cylinder 1341 such that the centerline of the housing bosses 1345 are perpendicular to and offset from the centerline of the housing cylindrical bore 1343. Each of the housing bosses 1345 provide support for a first rotational axis straddle bearing 1389. The first rotational axis drive component 1398 is straddle mounted between the first rotational axis straddle bearings 1389 such that the shaft of the first rotational axis drive component 1398 extends through each of the first rotational axis straddle bearings 1389. One of the housing bosses 1345 has a housing boss surface 1344 perpendicular to the centerline of the housing boss 1345. The first rotational axis drive unit 86 is mounted to the housing boss surface 1344 and couples to the shaft of the first rotational axis drive component 1398. The first rotational axis drive component 1398 meshes with the first axial cam driven component 1399, thus coupling rotational energy from the first rotational axis drive unit 86 to the first axial cam 1370.

Alternate Closed-Form Cam Surfaces and Followers

Figure 29:
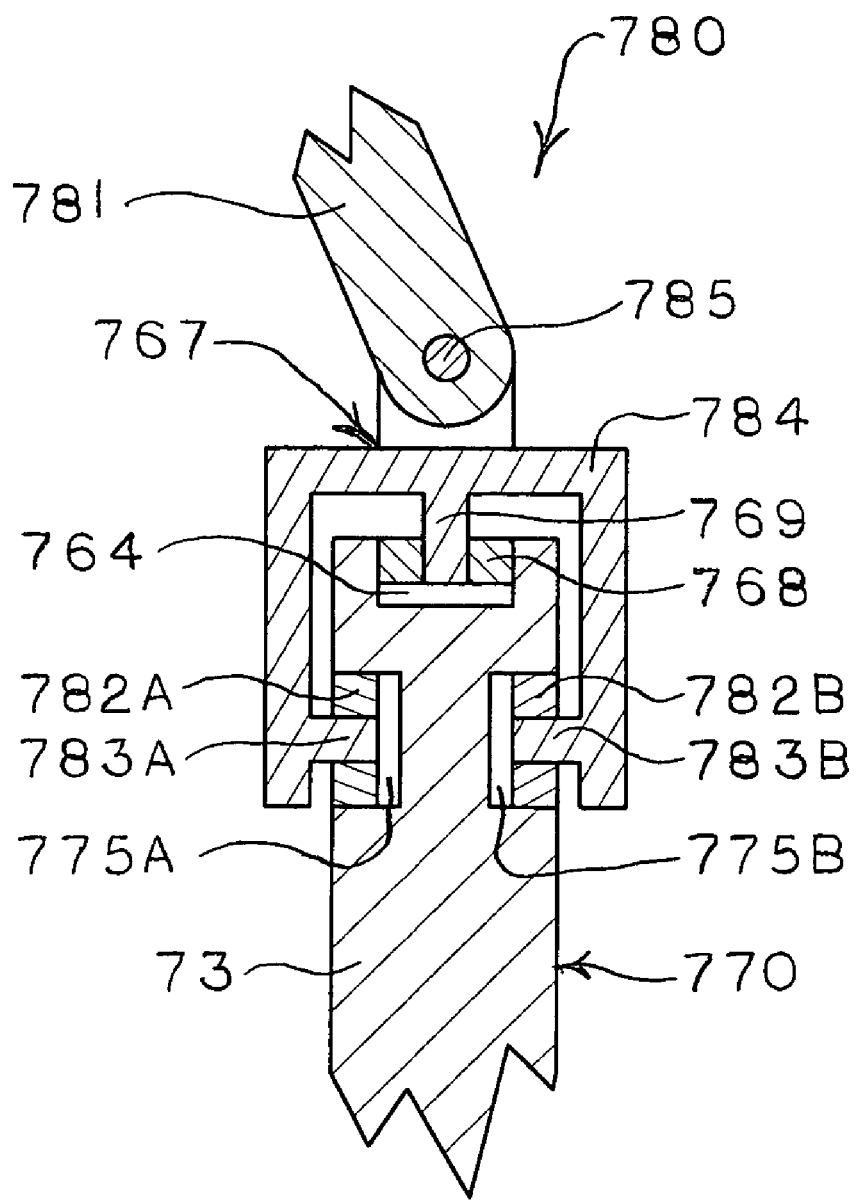
FIG. 29 is an enlarged detail cross-sectional view of the alternate axial cam-follower arrangement of FIG. 16 and FIG. 16A.

Motion-positioning apparatus 739 and 739A in FIG. 15, FIG. 15A, FIG. 16, and FIG. 16A illustrates alternative versions of a form-closed axial cam-follower arrangement of the motion-positioning apparatus 39 shown in FIG. 1 and FIG. 2. The cam surface of the first axial cam 770 comprises two grooves about the first axial cam surface cylinder 73 as shown in FIG. 29. The first cam surface 775A is a groove about the inside surface of the first axial cam surface cylinder 73. The second cam surface 775B is a groove about the outside surface of the first axial cam surface cylinder 73. A first axial cam tracker 767 tracks the first axial cam surfaces 775A and 775B. The first axial cam tracker 767 comprises a U-shaped yoke 784 adjacent the first axial cam surfaces 775A and 775B. The first axial cam tracker U-shaped yoke 784 has a first axial cam tracker rolling element support 783A protruding from the inside surface of the first axial cam tracker U-shaped yoke 784 and aligned center of the groove of the first axial cam surface 775A. A first axial cam tracker rolling element 782A is attached to the first axial cam tracker rolling element support 783A and tracks in the groove of the first axial cam surface 775A. A second first axial cam tracker rolling element support 783B protrudes from the inside surface of the first axial cam tracker U-shaped yoke 784 and is aligned center of the groove of the first axial cam surface 775B. A first axial cam tracker rolling element 782B is attached to the first axial cam tracker rolling element support 783B and tracks in the groove of the first axial cam surface 775B. The first axial cam surface cylinder 73 has a first axial cam tracker stabilizer surface 764. The first axial cam tracker stabilizer surface 764 is a groove about the axial end of the the first axial cam surface cylinder 73. A first axial cam tracker stabilizer element support 769 protrudes from the inside surface of the first axial cam tracker U-shaped yoke 784 and is aligned center of the first axial cam tracker stabilizer surface 764. A first axial cam tracker stabilizer rolling element 768 is attached to the first axial cam tracker stabilizer element support 769 and tracks in the first axial cam tracker stabilizer surface 764 to add stability to the first axial cam tracker 767. A first axial cam tracker pivot point 785 is attached to the first axial cam tracker U-shaped yoke 784. The first axial cam tracker pivot point 785 is a one-degree of freedom rotational joint with an axis of rotation parallel to the first rotational axis of the pivot joint 754 as shown in FIG. 15, FIG. 15A, FIG. 16, and FIG. 16A.

Motion-positioning apparatus 739 in FIG. 15 and FIG. 16 further depicts an alternative version of the form-closed axial cam-follower arrangement of the motion-positioning apparatus 39 shown in FIG. 1 and FIG. 2 as comprising a single cam follower 780 in FIG. 15 and FIG. 16. The cam follower 780 comprises: a single work load support stationary pivot point 751, a single first axial cam follower link 781, and a single first axial cam tracker 767. The work load support stationary pivot point 751 is attached to the work load support 750 and aligned with the first axial cam surface cylinder 73. The work load support stationary pivot point 751 is a one-degree of freedom rotational joint with an axis of rotation parallel to the first rotational axis of the pivot joint 754. The first axial cam follower link 781 is connected-between the first axial cam tracker pivot point 785 of the first axial cam tracker 767 and the work load support stationary pivot point 751. The stationary slotted link 755 is extended such that the first rotational axis of the pivot joint 754 aligns with the first axial cam tracker pivot point 785. The rise displacement and fall displacement magnitudes of the first axial cam surface 775 need not be equal along coordinates 180 degrees apart on the first axial cam surface 775, thus coordinate points 180 degrees apart on the first axial cam surface 775 are independent. The form-closed axial cam-follower arrangement just described and shown in-FIG. 15 and FIG. 16 is applicable to all the embodiments of the motion-positioning apparatus illustrated in FIG. 1-FIG. 28.

Figure 16A:
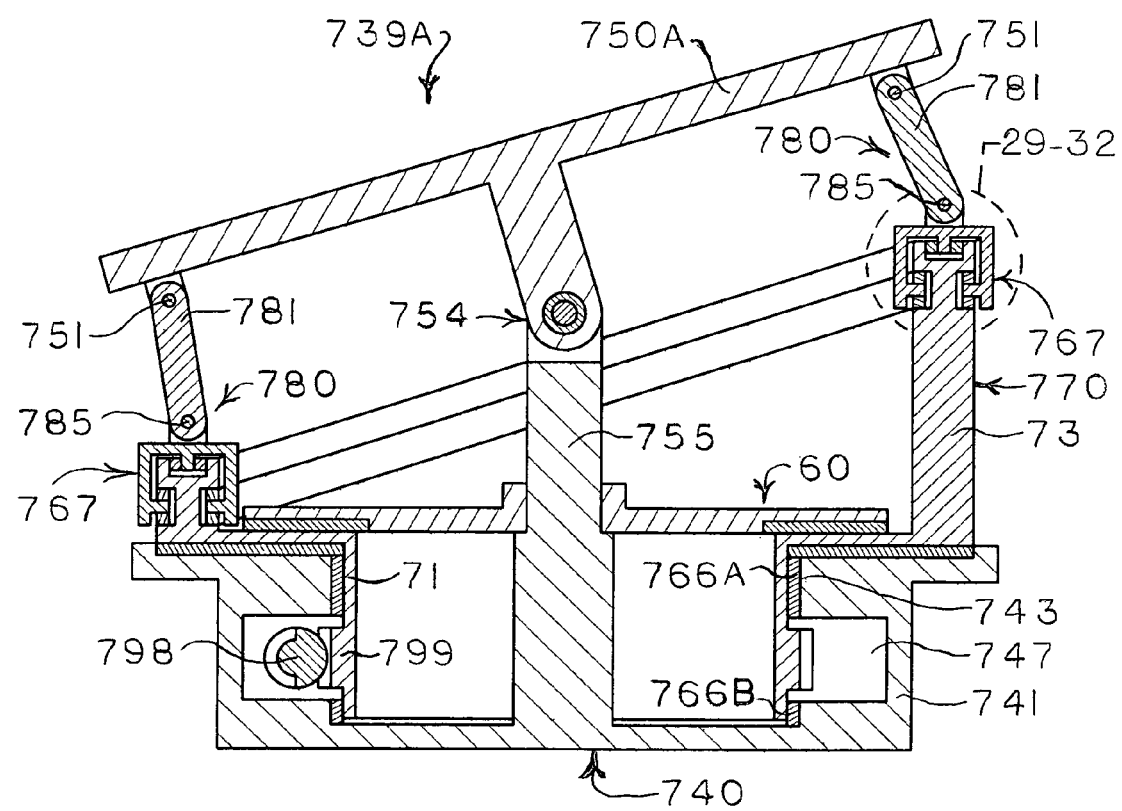
FIG. 16A is a cross-sectional view of the motion-positioning apparatus at line 16A-16A of FIG. 15A.

Motion-positioning apparatus 739A in FIG. 15A and FIG. 16A further depicts an alternative version of the form-closed axial cam-follower arrangement of the motion-positioning apparatus 39 shown in FIG. 1 and FIG. 2 as comprising two cam followers 780 in FIG. 15A and FIG. 16A. Each of the two cam followers 780 comprising: a work load support stationary pivot point 751, a first axial cam follower link 781, and a first axial cam tracker 767. The two work load support stationary pivot points 751 being attached to the work load support 750A, 180 degrees apart and aligned with the first axial cam surface cylinder 73. The work load support stationary pivot points 751 are one-degree of freedom rotational joints with axes of rotation parallel to the first rotational axis of the pivot joint 754. The first of the first axial cam follower links 781 is connected between the first axial cam tracker pivot point 785 of a first of the first axial cam trackers 767 and one of the work load support stationary pivot points 751. The second of the first axial cam follower links 781 is connected between the first axial cam tracker pivot point 785 of a second of the first axial cam trackers 767 and the other work load support stationary pivot point 751. The stationary slotted link 755 is extended such that the first rotational axis of the pivot joint 754 lies center a line between the two first axial cam tracker pivot points 785. In FIG. 15A and FIG. 16A the rise displacement magnitude must equal the fall displacement magnitude at any coordinates 180 degrees apart on the first axial cam surface 775. The form-closed axial cam-follower arrangement just described and shown in FIG. 15A and FIG. 16A is applicable to all the embodiments of the motion-positioning apparatus illustrated in FIG. 1-FIG. 28.

Figure 30:
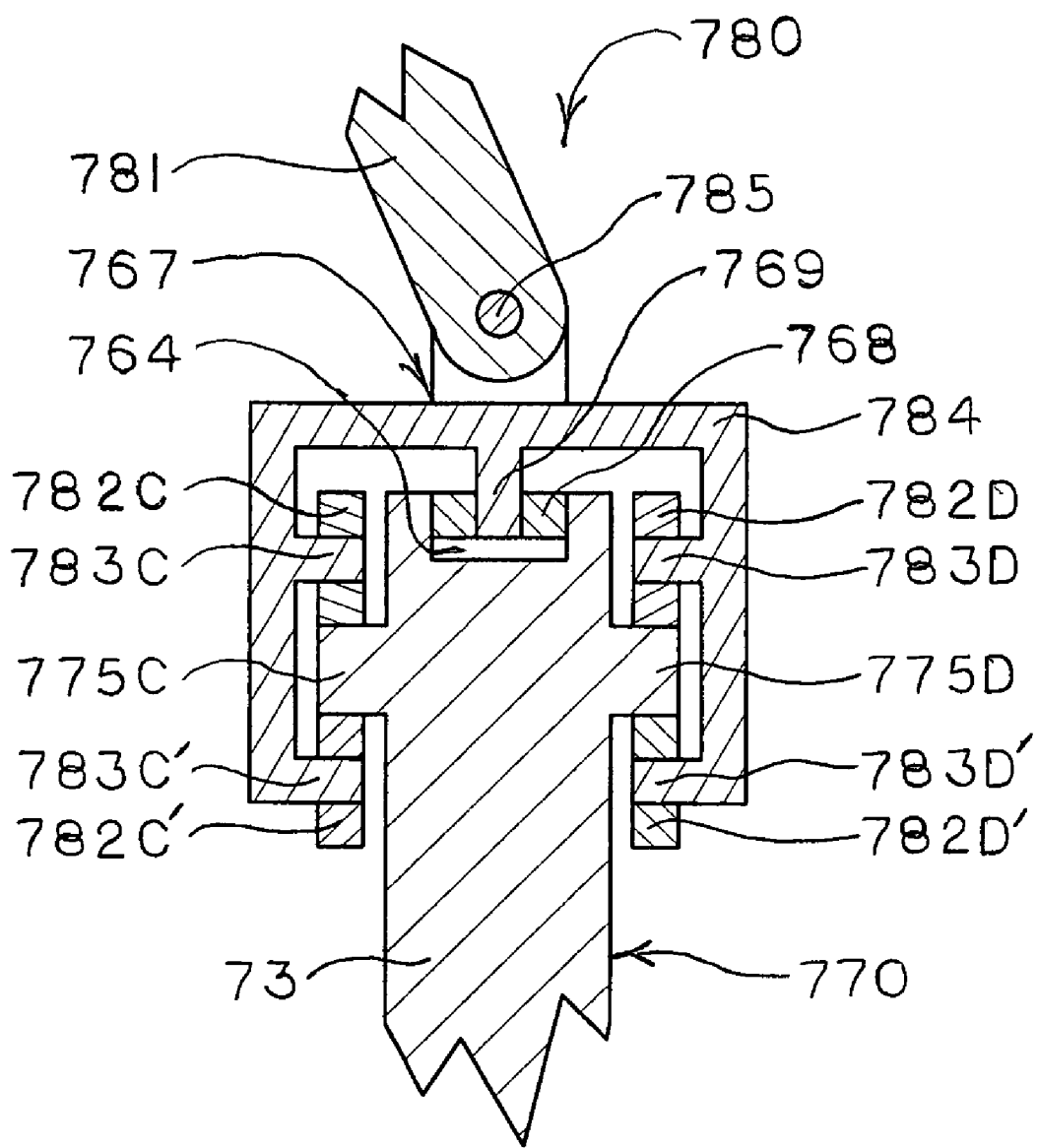
FIG. 30 is an alternate enlarged detail cross-sectional view of the alternate axial cam-follower arrangement-of FIG. 16 and FIG. 16A.
Figure 31:
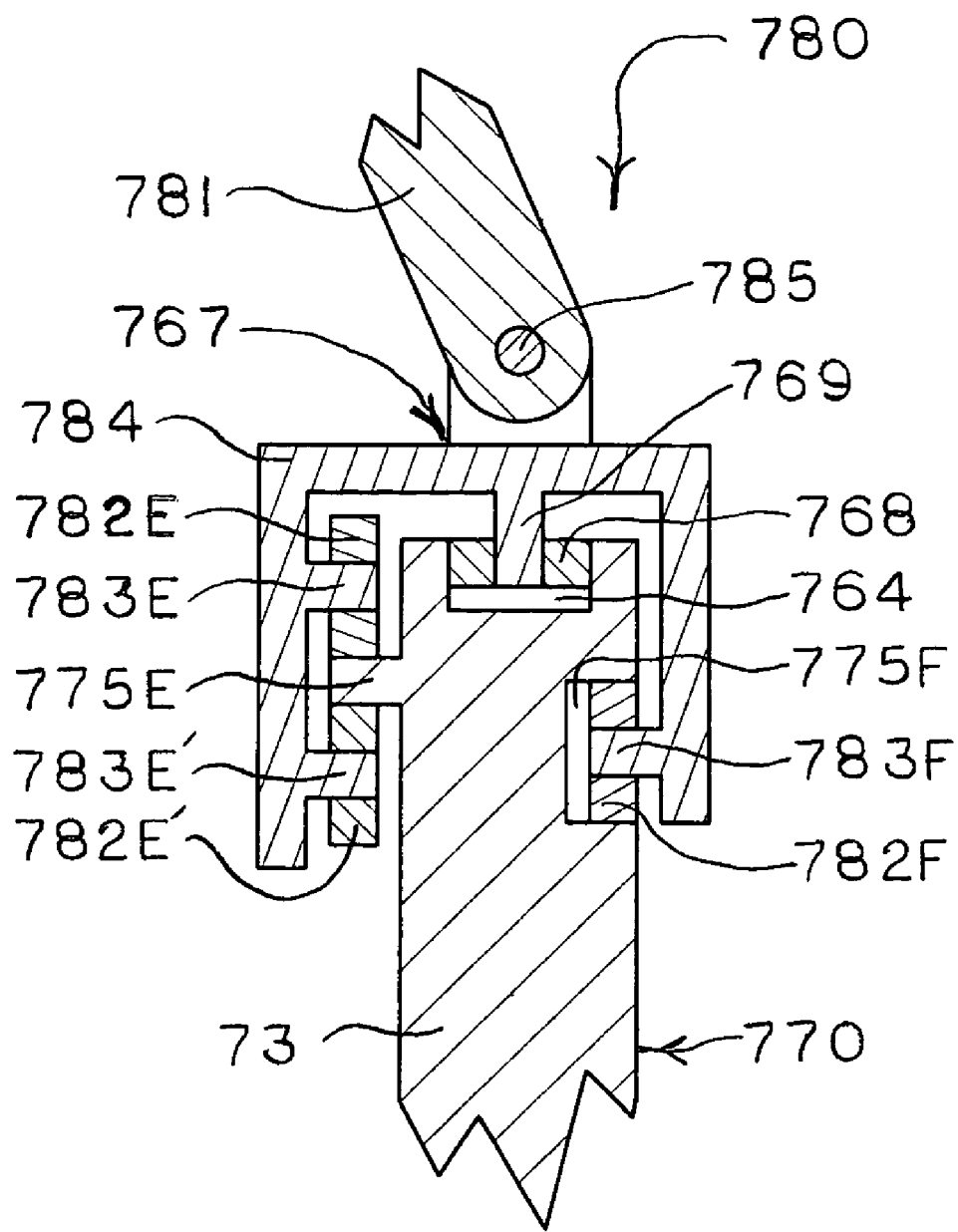
FIG. 31 is an alternate enlarged detail cross-sectional view of the alternate axial cam-follower arrangement of FIG. 16 and FIG. 16A.
Figure 32:
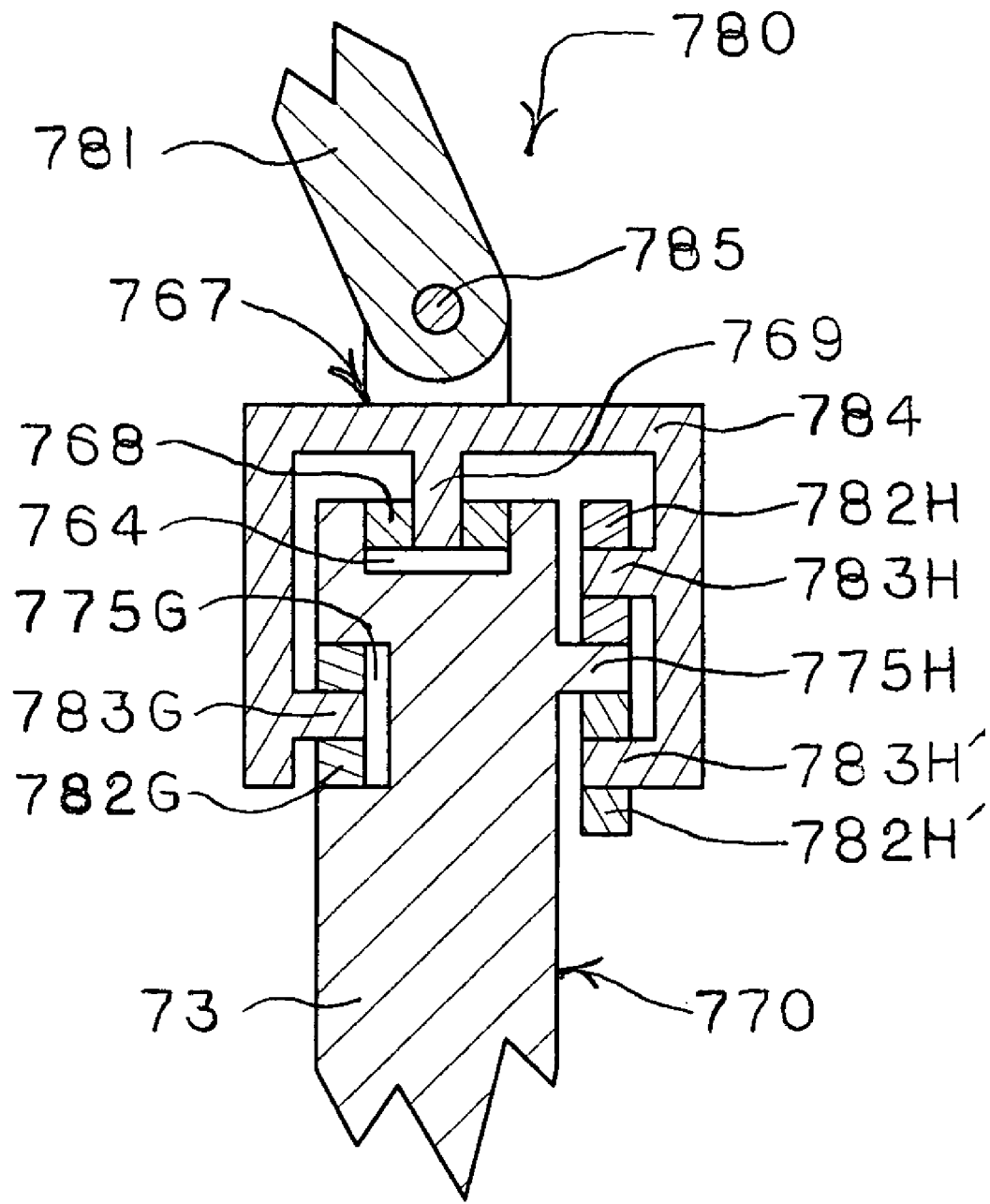
FIG. 32 is an alternate enlarged detail cross-sectional view of the alternate axial cam-follower arrangement of FIG. 16 and FIG. 16A.

FIG. 30-32 show alternative cam surface configurations for the first axial cam surfaces 775A and 775B shown in FIG. 15, FIG. 15A, FIG. 16, FIG. 16A, and FIG. 29. The alternative first axial cam surfaces are of type closed-form selected from group consisting of axial grooved cam surface, ribbed axial cam surface, or combinations of axial grooved cam surfaces and ribbed axial cam surfaces. Further illustrated axial cam surface combinations comprising:

a) a first axial cam surface 775C comprising a ribbed surface protruding about the inside surface of the first axial cam surface cylinder 73 and a first axial cam surface 775D further comprising a ribbed surface protruding about the outside surface of the first axial cam surface cylinder 73 as shown in FIG. 30.

b) a first axial cam surface 775E comprising a ribbed surface protruding about the inside surface of the first axial cam surface cylinder 73 and a first axial cam surface 775F further comprising a groove about the outside surface of the first axial cam surface cylinder 73 as shown in FIG. 31.

c) a first axial cam surface 775G comprising a groove about the inside surface of the first axial cam surface cylinder 73 and a first axial cam surface 775H further comprising a ribbed surface protruding about the outside surface of the first axial cam surface cylinder 73 as shown in FIG. 32.

FIG. 30 shows the first axial cam tracker rolling element support 783C and 783D protruding from the first axial cam tracker 767. The first axial cam tracker rolling element support 783C supports the first axial cam tracker rolling element 782C which contacts the first axial cam surface 775C adjacent the axial end of the first axial cam surface cylinder 73. Further, the first axial cam tracker rolling element support 783D supports the first axial cam tracker rolling element 782D which contacts the first axial cam surface 775D adjacent the axial end of the first axial cam surface cylinder 73. The first axial cam tracker rolling element 782C and the first axial cam tracker rolling element 782D are sufficient for the form-closed axial cam-follower arrangement shown in FIG. 15A and FIG. 16A which uses two first axial cam followers 780. For the form-closed axial cam-follower arrangement shown in FIG. 15 and FIG. 16, an additional first axial cam rolling element support 783C' supporting first axial cam tracker rolling element 782C' is required. The first axial cam rolling element 782C' contacts the first axial cam surface 775C opposite the first axial cam rolling element 782C. The first axial cam rolling element support 783D' supporting the first axial cam tracker rolling element 782D' are optional. The optional first axial cam rolling element 782D' contacts the first axial cam surface 775D opposite the first axial cam rolling element 782D.

Further FIG. 31 depicts the ribbed axial cam surface having two rolling elements in contact with the opposite sides of first axial cam surface 775E. The first axial cam tracker rolling element support 783E supports the first axial cam tracker rolling element 782E in contact with the first axial cam surface 775E adjacent the axial end of the first axial cam surface cylinder 73. Also, the first axial cam tracker rolling element support 783E' supports the first axial cam tracker rolling element 782E' in contact with the first axial cam surface 775E opposite the axial end of the first axial cam surface cylinder 73. Further, the first axial cam tracker rolling element support 783F supports the first axial cam tracker rolling element 782F in contact with the first axial cam surface 775F. The first axial cam tracker rolling element 782E' is optional for the form-closed axial cam-follower arrangement shown in FIG. 15A and FIG. 16A which uses two first axial cam followers 780.

Further FIG. 32 depicts the first axial cam tracker rolling element support 783G supporting the first axial cam tracker rolling element 782G in contact with the first axial cam surface 775G. The first axial cam tracker rolling element support 783H supports the first axial cam tracker rolling element 782H in contact with the first axial cam surface 775H adjacent the axial end of the first axial cam surface cylinder 73. The first axial cam tracker rolling element 782G and the first axial cam tracker rolling element 782H are sufficient for the form-closed axial cam-follower arrangement shown in FIG. 15A and FIG. 16A which-uses two first axial cam followers 780. For the form-closed axial cam-follower arrangement shown in FIG. 15 and FIG. 16, an additional first axial cam rolling element support 783H' supporting first axial cam tracker rolling element 782H' is required. The first axial cam rolling element 782H' contacts the first axial cam surface 775H opposite the axial end of the first axial cam surface cylinder 73. The alternate first axial cam surface configurations described in FIG. 29-FIG. 32 are the preferred alternate first axial cam surfaces of type closed-form selected from group consisting of axial grooved cam surface, ribbed axial cam surface, or combinations of axial grooved cam surfaces and ribbed axial cam surfaces. The alternate first axial cam-surface configurations just described and shown in FIG. 29-FIG. 32 are applicable to all the embodiments of the motion-positioning apparatus illustrated in FIG. 1-FIG. 28.

Alternate Means for Retaining the First Axial Cam Axial Force Within the Housing Motion-positioning apparatus 639 in FIG. 13 and FIG. 14 illustrates an alternative version of means for retaining the first axial cam 670 axial force within the housing 640. The first axial cam flange 672 has a diameter large than the outside diameter of the first axial cam surface cylinder 73. A retaining ring 63 encircles the first axial cam flange 672 surface which is larger than the outside diameter of the first axial cam surface cylinder 73. The retaining ring 63 is attached to the housing flange 42. A retaining ring thrust bearing 64 resides in contact between the first axial cam flange 672 and the retaining ring 64. The retaining ring thrust bearing 64 is either a rolling element bearing or a sliding bearing. The stationary slotted link 655 of the pivot joint 654 is straight and has no shoulder surface. The means for retaining the first axial cam 670 axial force within the housing 640 as shown in FIG. 13 and FIG. 14 is applicable to all embodiments shown in FIG. 1, FIG. 2, and FIG. 5-FIG. 16A.

Motion-positioning apparatus 1339 in FIG. 27 and FIG. 28 illustrates an alternative version of means for retaining the first axial cam 1370 axial force within the housing 1340. The first axial cam 1370 has a retaining flange 1378 protruding from the outside surface of the first axial cam cylinder 171. A retaining ring 1363 encircles the outer surface of the first axial cam retaining flange 1378. The retaining ring 1363 is attached to the housing 1340. A retaining ring thrust bearing 1364 resides in contact between the first axial cam retaining flange 1378 and the retaining ring 1364. The retaining ring thrust bearing 1364 is either a rolling element bearing or a sliding bearing. The stationary slotted link 1355 of the pivot joint 1354 is straight and has no shoulder surface. The means for retaining the first axial cam 1370 axial force within the housing 1340 as shown in FIG. 27 and FIG. 28 is applicable to all embodiments shown in FIG. 3, FIG. 4, and FIG. 17-FIG. 28.

Alternative Embodiment Features

Although the present invention has been described in considerable detail with reference to certain preferred versions thereof, other versions are possible. For example:

i) Referring to FIG. 1-FIG. 28, the housing outside surface may be of any geometrical shape substantially rigid to support the work load.

ii) Referring to FIG. 1-FIG. 28, the work load support may be the work load, a support frame or surface of any surface contour sufficient to support the work load. The work load support attachment to the pivot joint and first axial cam follower may be offset from the center of the work load support.

iii) Referring to FIG. 1-FIG. 28, the pivot joint may be a rotatable joint with two or more degrees of freedom. Use of a two or more degree of freedom joint, will require additional support of the work load support to limit rotation to a single axis of rotation.

iv) Referring to FIG. 7, FIG. 8, FIG. 13, FIG. 14, FIG. 19, FIG. 20, FIG. 25, and FIG. 26 for the 90 degree intersecting drive sets, the centerline of the first rotational axis drive component need not always be perpendicular to the centerline of the first axial cam driven component, for the centerline of the first rotational axis drive component can be an angle less than or greater than 90 degrees to the centerline of the first axial cam driven component.
v) Referring to FIG. 9, FIG. 10, FIG. 15, FIG. 15A, FIG. 16, FIG. 16A, FIG. 21, FIG. 22, FIG. 27, and FIG. 28 for the 90 degree non-intersecting drive sets, the centerline of the first rotational axis drive component need not always be perpendicular to the centerline of the first axial cam driven component, for the centerline of the first rotational axis drive component can be an angle less than or greater than 90 degrees to the centerline of the first axial cam driven component.
vi) Referring to FIG. 1-28, the slot and the tongue of the stationary slotted link and the rotatable tongued link may be reversed such that the stationary slotted link instead has a tongue and the rotatable tongued link instead is slotted.
vii) Referring to FIG. 1-28, the first rotational axis drive unit may be a motor or a motor plus speed change set.
viii) Referring to FIG. 1-28, the first axial cam rolling element and first axial cam rolling element axle of the first axial cam follower may be replaced by a cam roll and roll stud. The roll stud would use a single attachment point to the first axial cam follower to support the cam roll in contact with the first axial cam surface.

Therefore, the spirit and scope of the appended claims should not be limited to the description of the preferred versions contained herein. Any element in a claim that does not explicitly state "means for" performing a specified function, or "step for" performing a specific function, is not to be interpreted as a "means" or "step" clause as specified in 35 U.S.C., Section 112, Paragraph 6. In particular, the use of "step of" in the claims herein is not intended to invoke provisions of 35 U.S.C., Section 112, Paragraph 6.

What is claimed is:

1. A motion-positioning apparatus for generating movement of a work load about a first rotational axis of a three orthogonal axes system, said motion-positioning apparatus comprising:
   a) a housing substantially rigid to support the work load, said housing comprising:
      i) a housing cylindrical bore; and
      ii) a housing load support surface;
   b) a work load support being substantially rigid;
   c) a pivot joint having at least one axis of rotational freedom, said pivot joint axis of rotation being the first rotational axis of said motion-positioning apparatus;
   said pivot joint being attached between said work load support and said housing, such that said pivot joint is centered about said housing cylindrical bore and said work load support is rotatable about the first rotational axis;
   d) a first axial cam, said first axial cam being a substantially rigid first axial cam cylinder, said first axial cam cylinder comprising:
      i) a first axial cam load support surface;
      ii) a bore through said first axial cam cylinder to provide clearance about said pivot joint;
      iii) a first axial cam surface formed at or near a first axial end of said first axial cam cylinder; and
      iv) a second opposite axial end of said first axial cam cylinder is inserted into said housing cylindrical bore so that said first axial cam load support surface transfers a force produced by the work load to said housing load support surface, wherein said first axial cam is rotatable relative to said housing;
   e) a first rotational axis drive unit mounted to said housing, with means for coupling rotational energy from said first rotational axis drive unit to said first axial cam, wherein said first rotational axis drive unit rotates said first axial cam relative to said housing; and
   f) at least one first axial cam follower attached to said work load support, said first axial cam follower contacts said first axial cam surface, wherein rotation of said first axial cam rotates said work load support about said pivot joint axis of rotation.

2. The motion-positioning apparatus according to claim 1, wherein said housing cylindrical bore has an open end and a closed end, said housing load support surface is substantially perpendicular to said housing cylindrical bore.

3. The motion-positioning apparatus according to claim 2, wherein said pivot joint extends from the closed end of said housing cylindrical bore along a centerline of said housing cylindrical bore such that said pivot joint is centered in the open end of said housing cylindrical bore.

4. The motion-positioning apparatus according to claim 1, wherein said pivot joint is a one-degree of freedom rotational joint, wherein said pivot joint is rotatable about the first rotational axis.

5. The motion-positioning apparatus according to claim. 1, wherein a magnitude of rise displacement and a magnitude of fall displacement of said first axial cam surface are equal at any two points on said first axial cam which are 180 degrees apart, said first axial cam follower is comprised of two first axial cam followers 180 degrees apart and aligned perpendicular to the first rotational axis of said pivot joint, wherein said first axial cam followers will rise and fall equal magnitude when said first axial cam is rotated.

6. The motion-positioning apparatus according to claim 5, wherein said first axial cam surface and said first axial cam follower create a form closure cam joint, each said first axial cam follower further comprising: a first axial cam follower link being substantially rigid, said first axial cam follower link having a first axial cam follower rolling element contacting said first axial cam surface.

7. The motion-positioning apparatus according to claim 1, wherein said first axial cam surface and said first axial cam follower create a form closure cam joint, said first axial cam surface selected from the group consisting of axial groove cam surface, ribbed axial cam surface, or combinations of axial groove cam surfaces and ribbed axial cam surfaces about said first axial cam cylinder, said first axial cam follower further comprising:
   a) a first axial cam tracker, wherein said first axial cam tracker further comprising:
      i) a first axial cam tracker U-shaped yoke adjacent said first axial cam surface;
      ii) a first axial cam tracker pivot point being attached to said first axial cam tracker U-shaped yoke; and
      iii) at least one first axial cam tracker cam surface rolling element being supported by said first axial cam tracker U-shaped yoke, such that said first axial cam tracker cam surface rolling elements tracks said first axial cam surface;
   b) a work load support stationary pivot point attached to said work load support; and
   c) a connecting link being attached between said work load support stationary pivot point and said first axial cam tracker pivot point.

8. The motion-positioning apparatus according to claim 7, wherein the first axial end of said first axial cam cylinder having a first axial cam stabilizer surface comprising a groove or ribbed surface, said first axial cam tracker having at least one stabilizer surface rolling element to track said first axial cam stabilizer surface.

9. The motion-positioning apparatus according to claim 1, wherein the means for coupling rotational energy from said first rotational axis drive unit to said first axial cam being a drive set selected from the group consisting of parallel shaft drive sets, 90 degree intersecting drive sets, or 90 degree non-intersecting drive sets.

10. The motion-positioning apparatus according to claim 1, wherein said first rotational axis drive unit is a motor selected from the group consisting of electric motor, pneumatic motor, or hydraulic motor.

11. The motion-positioning apparatus according to claim 1, wherein said motion-positioning apparatus having means for axially retaining said first axial cam within said housing.

12. The motion-positioning apparatus according to claim 1, wherein said work load support being the work load, such that the work load is attached to said pivot joint and said at least one first axial cam follower being attached to the work load.

13. A motion-positioning apparatus for generating movement of a work load about a first rotational axis of a three orthogonal axes system, said motion-positioning apparatus comprising:
   a) a housing substantially rigid to support the work load, said housing comprising:
      i) a housing flange;
      ii) a housing cylindrical bore, said housing cylindrical bore being open at said housing flange and closed at end opposite said housing flange; and
      iii) a housing load support surface being a surface of said housing flange that is perpendicular to said housing cylindrical bore;
   b) a work load support being substantially rigid;
   c) a pivot joint having one axis of rotational freedom, said pivot joint axis of rotation being the first rotational axis of said motion-positioning apparatus, said pivot joint being attached between said work load support and the closed end of said housing, such that said pivot joint is centered in the open end of said housing cylindrical bore and said work load support is rotatable about said pivot joint axis of rotation;
   d) a first axial cam, said first axial cam being a substantially rigid first axial cam cylinder, said first axial cam cylinder comprising:
      i) a first axial cam flange;
      ii) a first axial cam surface encircling at or near an axial end of said first axial cam cylinder;
      iii) a first axial cam load support surface being a surface of said first axial cam flange opposite said first axial cam surface;
      iv) a first axial cam bore through said first axial cam cylinder to provide clearance about said pivot joint; and
      vi) a first axial cam driven component being attached to said first axial cam cylinder, said first axial cam cylinder inserted into said housing cylindrical bore so that said first axial cam load support surface transfers a force produced by the work load to said housing load support surface, wherein said first axial cam is rotatable relative to said housing;
   e) a first rotational axis drive unit being mounted to said housing, said first rotational axis drive unit is a motor selected from the group consisting of electric motor, pneumatic motor, or hydraulic motor, wherein rotational energy is provided by said first rotational axis drive unit;
   f) a first rotational axis drive set comprising at least a first rotational axis drive component and said first axial cam driven component, said first rotational axis drive set providing means for coupling rotational energy from said first rotational axis drive unit to said first axial cam, said first rotational axis drive set being a drive set selected from the group consisting of parallel shaft drive sets, 90 degree intersecting drive sets, or 90 degree non-intersecting drive sets; and
   g) at least one first axial cam follower being attached to said work load support and aligned perpendicular to the first rotational axis of said pivot joint, said first axial cam follower extending from said work load support and contacting said first axial cam surface, wherein rotation of said first axial cam rotates said work load support about the first rotational axis of said pivot joint.

14. The motion-positioning apparatus according to claim 13, wherein said first axial cam surface and said first axial cam follower create a form closure cam joint, said first axial cam surface having a rise displacement magnitude equal to a fall displacement magnitude at any coordinates along said first axial cam surface 180 degrees apart, said first axial cam follower consisting of two first axial cam followers 180 degrees apart, said first axial cam followers each further comprising:
   a) a first axial cam follower link being substantially rigid to said work load support; and
   b) a first axial cam follower cam surface rolling element being supported by said first axial cam follower link, such that said first axial cam follower cam surface rolling element contacts said first axial cam surface.

15. The motion-positioning apparatus according to claim 13, wherein said first axial cam surface and said first axial cam follower create a form closure cam joint, said first axial cam surface selected from the group consisting of axial groove cam surface, ribbed axial cam surface, or combinations of axial groove cam surfaces and ribbed axial cam surfaces about said first axial cam cylinder, said at least one first axial cam follower further comprising:
   a) a first axial cam tracker, said first axial cam tracker further comprising:
      i) a first axial cam tracker U-shaped yoke adjacent said first axial cam surface;
      ii) a first axial cam tracker pivot point being attached to said first axial cam tracker U-shaped yoke; and
      iii) at least one first axial cam tracker cam surface rolling element being supported by said first axial cam tracker U-shaped yoke, such that said first axial cam tracker cam surface rolling element tracks said first axial cam surface;
   b) a work load support stationary pivot point attached to said work load support; and
   c) a connecting link being attached between said work load support stationary pivot point and said first axial cam tracker pivot point.

16. The motion-positioning apparatus according to claim 15, wherein an axial end of said first axial cam cylinder having a first axial cam stabilizer surface comprising a groove or ribbed surface, said first axial cam tracker having at least one stabilizer surface rolling element to track said first axial cam stabilizer surface.

17. The motion-positioning apparatus according to claim 13, wherein said first rotational axis drive unit being mounted to said housing with said first rotational axis drive unit having an output centerline parallel to a centerline of said housing cylindrical bore, said first rotational axis drive set being a parallel shaft drive set with a rotational energy coupling point of said first rotational axis drive set being within said housing.

18. The motion-positioning apparatus according to claim 13, wherein said first rotational axis drive unit being mounted to said housing with said first rotational axis drive unit having an output centerline perpendicular to and intersecting a centerline of said housing cylindrical bore, said first rotational axis drive set being a 90 degree intersecting drive set with a rotational energy coupling point of said first rotational axis drive set being within said housing.

19. The motion-positioning apparatus according to claim 13, wherein said first rotational axis drive unit being mounted to said housing with said first rotational axis drive unit having an output centerline perpendicular to and non-intersecting a centerline of said housing cylindrical bore, said first rotational axis drive set being a 90 degree non-intersecting drive set with a rotational energy coupling point of said first rotational axis drive set being within said housing.

20. The motion-positioning apparatus according to claim 13, wherein said housing further comprising a housing cavity adjoining and encircling said housing cylindrical bore, such that said housing cavity is located between the open end and closed end of said housing cylindrical bore.

21. The motion-positioning apparatus according to claim 20, wherein said first rotational axis drive unit being mounted to said housing with said first rotational axis drive unit having an output centerline parallel to a centerline of said housing cylindrical bore, said first rotational axis drive set being a parallel shaft drive set with a rotational energy coupling point of said first rotational axis drive set being within said housing cavity.

22. The motion-positioning apparatus according to claim 20, wherein said first rotational axis drive unit being mounted to said housing with said first rotational axis drive unit having an output centerline perpendicular to and intersecting a centerline of said housing cylindrical bore, said first rotational axis drive set being a 90 degree intersecting drive set with a rotational energy coupling point of said first rotational axis drive set being within said housing cavity.

23. The motion-positioning apparatus according to claim 20, wherein said first rotational axis drive unit being mounted to said housing with said first rotational axis drive unit having an output centerline perpendicular to and non-intersecting a centerline of said housing cylindrical bore, said first rotational axis drive set being a 90 degree non-intersecting drive set with a rotational energy coupling point of said first rotational axis drive set being within said housing cavity.

24. The motion-positioning apparatus according to claim 13, further comprising:
 a) a first thrust bearing located between said housing load support surface and said first axial cam load support surface, said first thrust bearing selected from the group consisting of sliding and rolling element bearings; and
 b) a first radial bearing located between said housing cylindrical bore and said first axial cam cylinder, said first radial bearing selected from the group consisting of sliding and rolling element bearings.

25. The motion-positioning apparatus according to claim 13, further comprising:
 a) a first axial cam shoulder surface encircling said first axial cam bore and of less diameter than said first axial cam surface, said first axial cam shoulder surface being located along said first axial cam between said first axial cam surface and said first axial cam driven component;

b) a cap being secured to the side of said pivot joint attached to the closed end of said housing cylindrical bore, said cap being parallel to said first axial cam shoulder surface; and
 c) a cap thrust bearing being located between said cap and said first axial cam shoulder surface, said cap thrust bearing selected from the group consisting of sliding and rolling element bearings.

26. The motion-positioning apparatus according to claim 13, further comprising:
 a) said first axial cam flange having a diameter larger than said first axial cam surface;
 b) a retaining ring encircling said first axial cam flange, said retaining ring being attached to said housing flange; and
 c) a retaining ring thrust bearing residing between said first axial cam flange and said retaining ring, said retaining ring thrust bearing selected from the group consisting of sliding and rolling element bearings.

27. The motion-positioning apparatus according to claim 13, wherein said work load support being the work load, such that the work load is attached to said pivot joint and said at least one first axial cam follower being attached to the work load.

28. A motion-positioning apparatus for generating movement of a work load about a first rotational axis of a three orthogonal axes system, said motion-positioning apparatus comprising:
 a) a housing substantially rigid to support the work load, said housing comprising:
  i) a housing cylindrical bore, said housing cylindrical bore having an open end and a closed end; and
  ii) a housing load support surface, said housing load support surface being between said housing cylindrical bore and the closed end of said housing;
 b) a work load support being substantially rigid;
 c) a pivot joint having one axis of rotational freedom, said pivot joint axis of rotation being the first rotational axis of said motion-positioning apparatus, said pivot joint being attached between said work load support and the closed end of said housing, such that said pivot joint is centered in the open end of said housing cylindrical bore and said work load support is rotatable about the first rotational axis of said pivot joint;
 d) a first axial cam, said first axial cam being a substantially rigid first axial cam cylinder comprising:
  i) a first axial cam load support surface being a first axial end of said first axial cam cylinder;
  ii) a first axial cam bore through said first axial cam cylinder to provide clearance about said pivot joint;
  iii) a first axial cam surface encircling at or near a second opposite axial end of said first axial cam cylinder; and
  iv) a first axial cam driven component being attached to said first axial cam cylinder, said first axial end of said first axial cam cylinder inserted into said housing cylindrical bore so that said first axial cam load support surface transfers a force produced by the work load to said housing load support surface, wherein said first axial cam is rotatable relative to said housing;
 e) a first rotational axis drive unit being mounted to said housing, said first rotational axis drive unit being a motor selected from the group consisting of electric motor, pneumatic motor, or hydraulic motor, wherein rotational energy is provided by said first rotational axis drive unit;
 f) a first rotational axis drive set comprising at least a first rotational axis drive component and said first axial cam driven component, said first rotational axis drive set providing means for coupling rotational energy from said first rotational axis drive unit to said first axial cam, said first rotational axis drive set being a drive set selected from the group consisting of parallel shaft drive sets, 90 degree intersecting drive sets, or 90 degree non-intersecting drive sets; and g) at least one first axial cam follower being attached to said work load support and aligned perpendicular to said pivot joint axis of rotation, said first axial cam follower extending from said work load support and contacting said first axial cam surface, wherein rotation of said first axial cam rotates said work load support about the first rotational axis of said pivot joint.

29. The motion-positioning apparatus according to claim 28, wherein said first axial cam surface and said first axial cam follower create a form closure cam joint, said first axial cam surface having a rise displacement magnitude equal to a fall displacement magnitude at any coordinates along said first axial cam surface 180 degrees apart, said first axial cam follower consisting of two first axial cam followers 180 degrees apart, said first axial cam followers each further comprising:
   a) a first axial cam follower link being rigid to said work load support; and
   b) a first axial cam follower cam surface rolling element being supported by said first axial cam follower link, such that said first axial cam follower cam surface rolling element contacts said first axial cam surface.

30. The motion-positioning apparatus according to claim 28, wherein said first axial cam surface and said first axial cam follower create a form closure cam joint, said first axial cam surface selected from the group consisting of axial groove cam surface, ribbed axial cam surface, or combinations of axial groove cam surfaces and ribbed axial cam surfaces about said first axial cam cylinder, said at least one first axial cam follower further comprising:
   a) a first axial cam tracker, said first axial cam tracker further comprising:
      i) a first axial cam tracker U-shaped yoke adjacent said first axial cam surface;
      ii) a first axial cam tracker pivot point being attached to said first axial cam tracker U-shaped yoke; and
      iii) at least one first axial cam tracker cam surface rolling element being supported by said first axial cam tracker U-shaped yoke, such that said first axial cam tracker cam surface rolling element tracks said first axial cam surface;
   b) a work load support stationary pivot point attached to said work load support; and
   c) a connecting link being attached between said work load support stationary pivot point and said first axial cam tracker pivot point.

31. The motion-positioning apparatus according to claim 30, wherein the second axial end of said first axial cam cylinder having a first axial cam stabilizer surface comprising a groove or ribbed surface, said first axial cam tracker having at least one stabilizer surface rolling element to track said first axial cam stabilizer surface.

32. The motion-positioning apparatus according to claim 28, wherein said first rotational axis drive unit being mounted to said housing with said first rotational axis drive unit having an output centerline parallel to a centerline of said housing cylindrical bore, said first rotational axis drive set being a parallel shaft drive set with a rotational energy coupling point of said first rotational axis drive set being within said housing.

33. The motion-positioning apparatus according to claim 28, wherein the closed end of said housing further comprising a housing cavity adjoining said housing cylindrical bore and of smaller diameter than said housing load support surface, said first rotational axis drive unit being mounted to said housing with said first rotational axis drive unit having an output centerline perpendicular to and intersecting a centerline of said housing cylindrical bore, said first rotational axis drive set being a 90 degree intersecting drive set with a rotational energy coupling point of said first rotational axis drive set being within said housing cavity.

34. The motion-positioning apparatus according to claim 28, wherein the closed end of said housing further comprising a housing cavity adjoining said housing cylindrical bore and of smaller diameter than said housing load support surface, said first rotational axis drive unit being mounted to said housing with said first rotational axis drive unit having an output centerline perpendicular to and non-intersecting a centerline of said housing cylindrical bore, said first rotational axis drive set being a 90 degree non-intersecting drive set with a rotational energy coupling point of said first rotational axis drive set being within said housing cavity.

35. The motion-positioning apparatus according to claim 28, wherein said housing further comprising a housing cavity adjoining and encircling said housing cylindrical bore, said housing cavity being located between the open end and closed end of said housing cylindrical bore.

36. The motion-positioning apparatus according to claim 35, wherein said first rotational axis drive unit being mounted to said housing with said first rotational axis drive unit having an output centerline parallel to a centerline of said housing cylindrical bore, said first rotational axis drive set being a parallel shaft drive set with a rotational energy coupling point of said first rotational axis drive set being within said housing cavity.

37. The motion-positioning apparatus according to claim 35, wherein said first rotational axis drive unit being mounted to said housing with said first rotational axis drive unit having an output centerline perpendicular to and intersecting a centerline of said housing cylindrical bore, said first rotational axis drive set being a 90 degree intersecting drive set with a rotational energy coupling point of said first rotational axis drive set being within said housing cavity.

38. The motion-positioning apparatus according to claim 35, wherein said first rotational axis drive unit being mounted to said housing with said first rotational axis drive unit having an output centerline perpendicular to and non-intersecting a centerline of said housing cylindrical bore, said first rotational axis drive set being a 90 degree non-intersecting drive set with a rotational energy coupling point of said first rotational axis drive set being within said housing cavity.

39. The motion-positioning apparatus according to claim 28, further comprising:
   a) a first thrust bearing located between said housing load support surface and said first axial cam load support surface, said first thrust bearing selected from the group consisting of sliding and rolling element bearings; and
   b) a first radial bearing located between said housing cylindrical bore and said first axial cam cylinder, said first radial bearing selected from the group consisting of sliding and rolling element bearings.

40. The motion-positioning apparatus according to claim 28, further comprising:
   a) a first axial cam shoulder surface encircling said first axial cam bore and of less diameter than said first axial cam surface, said first axial cam shoulder surface being located along said first axial cam between said first axial cam surface and said first axial cam driven component;
b) a cap being secured to the side of said pivot joint attached to the closed end of said housing cylindrical bore, said cap being parallel to said first axial cam shoulder surface; and
c) a cap thrust bearing being located between said cap and said first axial cam shoulder surface, said cap thrust bearing selected from the group consisting of sliding and rolling element bearings.

41. The motion-positioning apparatus according to claim 28, further comprising:
a) a first axial cam retaining flange about the outside surface of said first axial cam cylinder;
b) a retaining ring encircling said first axial cam retaining flange, said retaining ring being attached to said housing; and
c) a retaining ring thrust bearing residing between said first axial cam retaining flange and said retaining ring, said retaining ring thrust bearing selected from the group consisting of sliding and rolling element bearings.

42. The motion-positioning apparatus according to claim 28, wherein said work load support being the work load, such that the work load is attached to said pivot joint and said at least one cam follower being attached to the work load.

43. A method of producing rotation of a work load about a first rotational axis of a three orthogonal axes system, which comprises:
a) supporting the work load upon a work load support, said work load supported by a pivot joint connected between a housing and said work load support, said housing having a housing cylindrical bore in which said pivot joint is centered, said pivot joint having one axis of rotational freedom which is said first rotational axis;
b) generating rotational energy by a first rotational axis drive unit mounted to said housing;
c) coupling the rotational energy from said first rotational axis drive unit to a first axial cam through a means for coupling rotational energy;
d) rotating said first axial cam having a first axial cam surface formed at or near one end of said first axial cam, an opposite end of said first axial cam inserted into said housing cylindrical bore, first axial cam having a first axial cam load support surface which transfers said work load force to a housing load support surface;
e) displacing at least one first axial cam follower contacting said first axial cam surface in a form-closed axial cam-follower arrangement where said first axial cam follower being aligned perpendicular to the first rotational axis of said pivot joint;
f) transmitting through said first axial cam follower to the work load the said first axial cam surface displacement; and
g) transforming said first axial cam surface displacement into a work load torque about said pivot joint, said pivot joint being centered in said first axial cam, wherein the work load is rotated about the first rotational axis of said pivot joint.

44. A method of producing rotation of a work load about a first rotational axis of a three orthogonal axes system, which comprises:
a) supporting the work load upon a work load support, said work load supported by a pivot joint connected between a housing and said work load support, said housing having a housing cylindrical bore which said pivot joint is centered, said pivot joint having one axis of rotational freedom which is said first rotational axis;
b) generating rotational energy by a first rotational axis drive unit mounted to said housing;
c) coupling the rotational energy from said first rotational axis drive unit to a first axial cam through means for coupling rotational energy;
d) rotating said first axial cam having a first axial cam surface formed at or near one end of said first axial cam, which produces a rise displacement and a fall displacement of equal magnitude, but opposite direction at any two points 180 degrees apart on said first axial cam surface, an opposite end of said first axial cam is inserted into housing cylindrical bore, said first axial cam having a first axial cam load support surface which transfers a work load force to a housing load support surface;
e) displacing a pair of first axial cam followers contacting said first axial cam surface at two points 180 degrees apart and aligned perpendicular to the first rotational axis of said pivot joint by the rise displacement and the fall displacement of equal magnitude and opposite direction;
f) transmitting through said first axial cam followers to the work load the rise displacement and the fall displacement of equal magnitude and opposite direction; and
g) transforming the rise displacement and the fall displacement of equal magnitude and opposite direction into a work load torque about said pivot joint, said pivot joint being centered in said first axial cam, wherein the work load is rotated about the first rotational axis of said pivot joint.

\* \* \* \* \*